United States Patent
Ji et al.

(10) Patent No.: US 12,376,048 B2
(45) Date of Patent: Jul. 29, 2025

(54) COMMUNICATION TIMING FOR SIDELINK RELAY BETWEEN A GROUND UE AND AN AERIAL DEVICE

(71) Applicant: QUALCOMM Incorporated, San Diego, CA (US)

(72) Inventors: Lianghai Ji, San Diego, CA (US); Huilin Xu, Temecula, CA (US); Qiang Wu, San Diego, CA (US); Jun Ma, San Diego, CA (US); Mehmet Izzet Gurelli, San Diego, CA (US); Weimin Duan, San Diego, CA (US); Karthik Anantha Swamy, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 654 days.

(21) Appl. No.: 17/451,631

(22) Filed: Oct. 20, 2021

(65) Prior Publication Data

US 2023/0120473 A1    Apr. 20, 2023

(51) Int. Cl.
*H04W 56/00* (2009.01)
*H04L 5/00* (2006.01)
*H04W 84/06* (2009.01)
*H04W 92/18* (2009.01)

(52) U.S. Cl.
CPC ......... *H04W 56/001* (2013.01); *H04L 5/0053* (2013.01); *H04W 84/06* (2013.01); *H04W 92/18* (2013.01)

(58) Field of Classification Search
CPC ... H04W 56/001; H04W 84/06; H04W 92/18; H04W 56/002; H04W 56/0025; H04W 56/0015; H04L 5/0053
See application file for complete search history.

(56) References Cited

U.S. PATENT DOCUMENTS

| | | | |
|---|---|---|---|
| 2021/0168574 A1 | 6/2021 | Zhang et al. | |
| 2021/0321348 A1 | 10/2021 | Ohara et al. | |
| 2022/0312535 A1* | 9/2022 | Wu | H04W 48/12 |
| 2023/0292273 A1* | 9/2023 | Zhang | H04W 56/0045 |

(Continued)

FOREIGN PATENT DOCUMENTS

WO    2020096693 A1    5/2020

OTHER PUBLICATIONS

International Search Report and Written Opinion—PCT/US2022/044433—ISA/EPO—Dec. 21, 2022.

(Continued)

*Primary Examiner* — Eric Myers
(74) *Attorney, Agent, or Firm* — Procopio, Cory, Hargreaves & Savitch LLP/QUALCOMM Incorporated

(57) ABSTRACT

A UE transmits a sidelink synchronization signal in response to a communication trigger, the sidelink synchronization signal including an indication of the communication trigger to be provided to a network. The UE receives a sidelink message from an aerial device in response to the sidelink synchronization signal. An aerial device receives, from a UE, a sidelink synchronization signal including an indication of a communication trigger associated with communication for a network. The aerial device transmits a sidelink message to the UE in response to reception of the sidelink synchronization signal that includes the indication of the communication trigger.

30 Claims, 17 Drawing Sheets

(56) References Cited

U.S. PATENT DOCUMENTS

2023/0319748 A1\* 10/2023 Castañeda Garcia ........................ H04W 56/0045 370/503
2024/0389113 A1\* 11/2024 Park ...................... H04W 72/25

OTHER PUBLICATIONS

3GPP: "3rd Generation Partnership Project, Technical Specification Group Radio Access Network NR, Physical Layer Procedures for Control (Release 16)", 3GPP TS 38.213, V16.7.0, Sep. 2021, 188 Pages.

3GPP: "3rd Generation Partnership Project, Technical Specification Group Services and System Aspects, Proximity-Based Services (ProSe), Stage 2 (Release 16)", 3GPP TS 23.303, V16.0.0, Jul. 9, 2020, 130 Pages.

3GPP: "3rd Generation Partnership Project, Technical Specification Group Services and System Aspects, Proximity-Based Services (ProSe), Stage 2 (Release 16)", 3GPP TS 23.303, V16.0.0, sections 4.6.4.3, 5.3 and 5.4.4, Jul. 9, 2020, 130 Pages.

\* cited by examiner

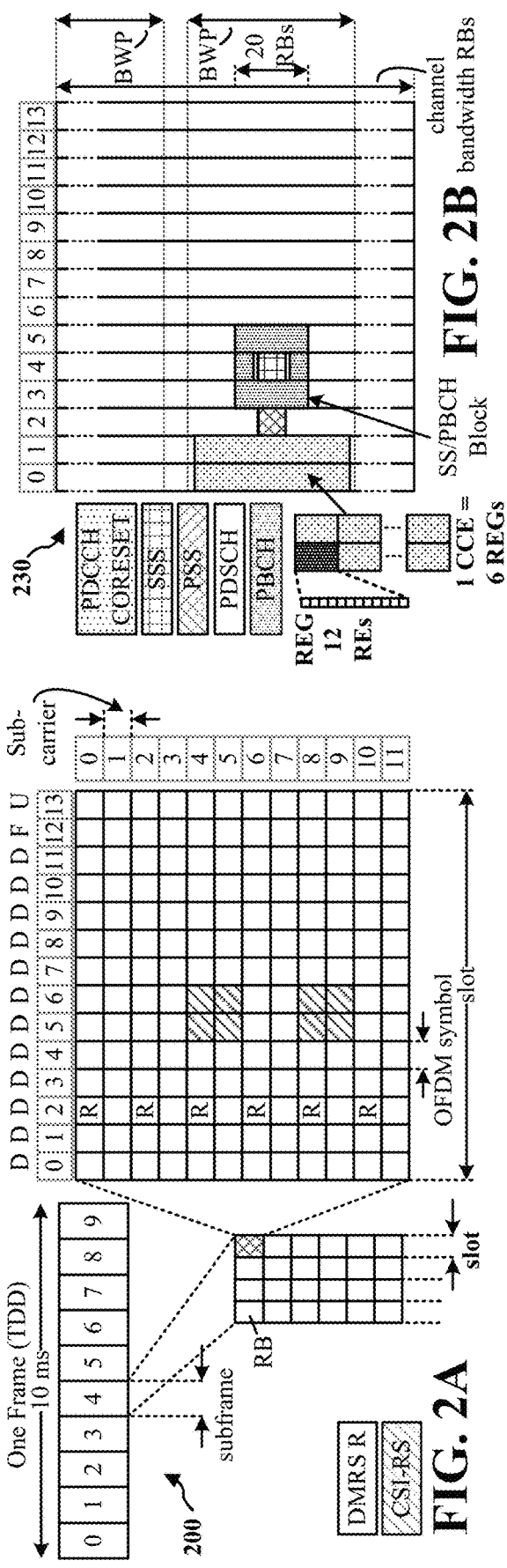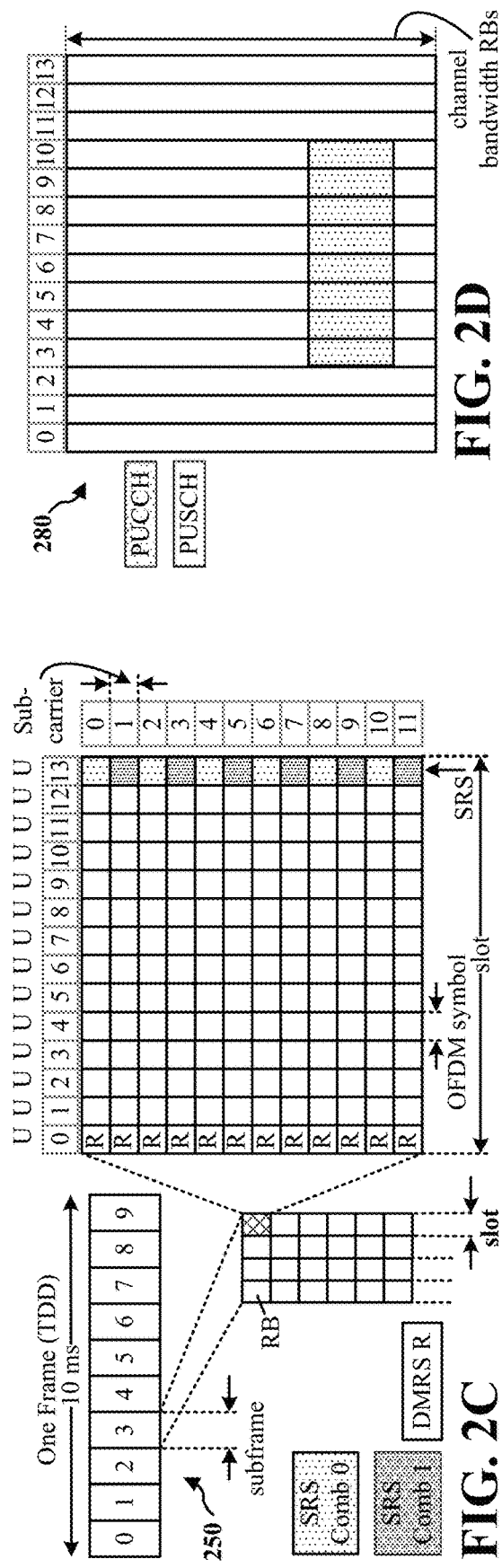

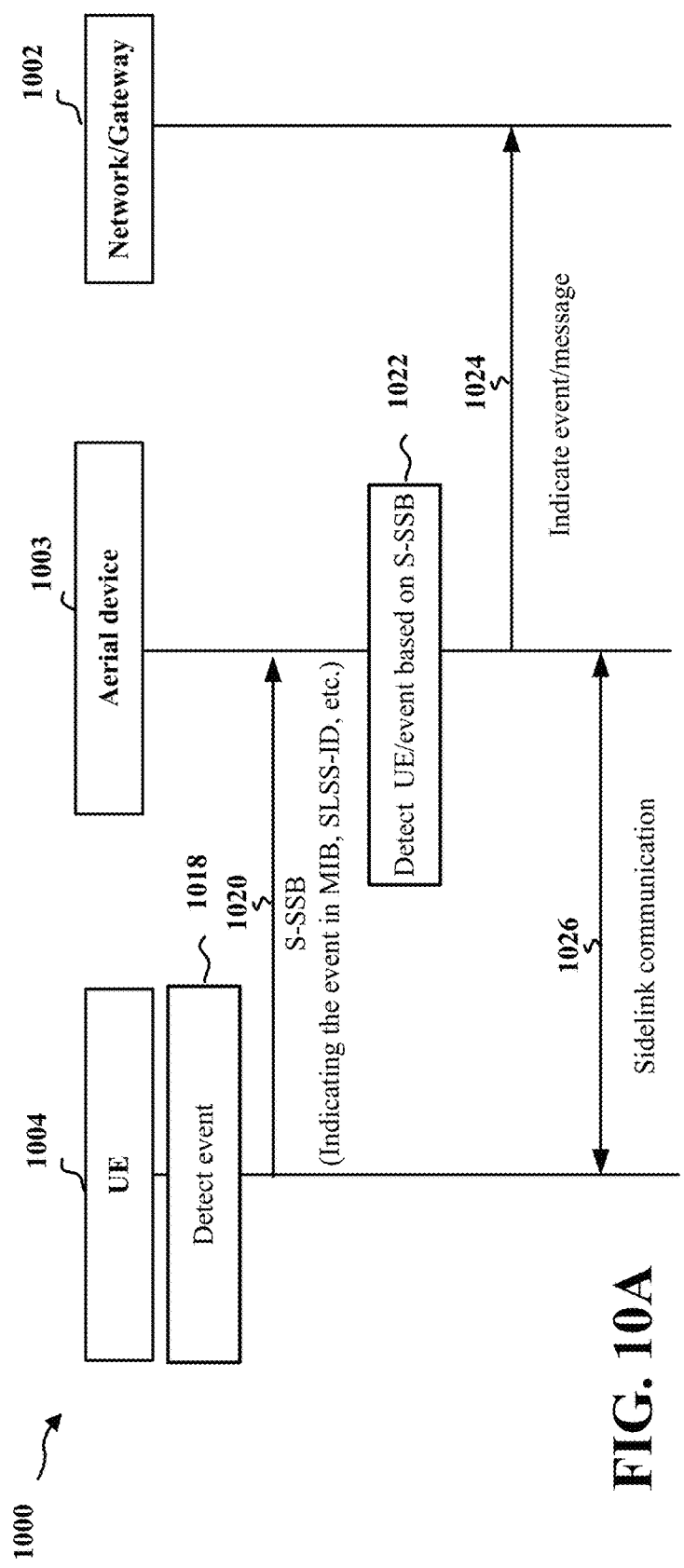
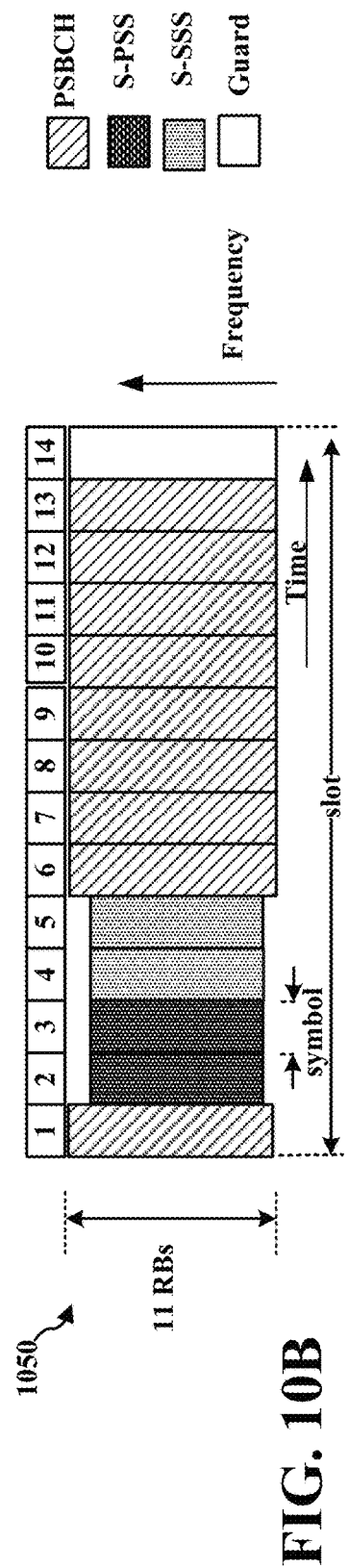
FIG. 10A
FIG. 10B

COMMUNICATION TIMING FOR SIDELINK RELAY BETWEEN A GROUND UE AND AN AERIAL DEVICE

INTRODUCTION

The present disclosure relates generally to communication systems, and more particularly, to sidelink communication with an aerial device.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a UE is provided. The method includes transmitting a sidelink synchronization signal in response to a communication trigger, the sidelink synchronization signal including an indication of the communication trigger to be provided to a network; and receiving a sidelink message from an aerial device in response to the sidelink synchronization signal.

In another aspect of the disclosure, an apparatus for wireless communication at a UE is provided. The apparatus includes means for transmitting a sidelink synchronization signal in response to a communication trigger, the sidelink synchronization signal including an indication of the communication trigger to be provided to a network; and means for receiving a sidelink message from an aerial device in response to the sidelink synchronization signal.

In another aspect of the disclosure, an apparatus for wireless communication at a UE is provided. The apparatus includes memory and at least one processor coupled to the memory, the memory and the at least one processor configured to transmit a sidelink synchronization signal in response to a communication trigger, the sidelink synchronization signal including an indication of the communication trigger to be provided to a network; and receive a sidelink message from an aerial device in response to the sidelink synchronization signal.

In another aspect of the disclosure, a computer-readable storage medium storing computer executable code is provided for wireless communication at a UE, the code when executed by a processor cause the processor to transmit a sidelink synchronization signal in response to a communication trigger, the sidelink synchronization signal including an indication of the communication trigger to be provided to a network; and receive a sidelink message from an aerial device in response to the sidelink synchronization signal.

In an aspect of the disclosure, a method of wireless communication at an aerial device is provided. The method includes receiving, from a UE, a sidelink synchronization signal including an indication of a communication trigger associated with communication for a network. The method includes transmitting a sidelink message to the UE in response to reception of the sidelink synchronization signal that includes the indication of the communication trigger.

In another aspect of the disclosure, an apparatus for wireless communication at an aerial device is provided. The apparatus includes means for receiving, from a UE, a sidelink synchronization signal including an indication of a communication trigger associated with communication for a network; and means for transmitting a sidelink message to the UE in response to reception of the sidelink synchronization signal that includes the indication of the communication trigger.

In another aspect of the disclosure, an apparatus for wireless communication at an aerial device is provided. The apparatus includes memory and at least one processor coupled to the memory, the memory and the at least one processor configured to receive, from a UE, a sidelink synchronization signal including an indication of a communication trigger associated with communication for a network; and transmit a sidelink message to the UE in response to reception of the sidelink synchronization signal that includes the indication of the communication trigger.

In another aspect of the disclosure, a computer-readable storage medium storing computer executable code is provided for wireless communication at an aerial device, the code when executed by a processor cause the processor to receive, from a UE, a sidelink synchronization signal including an indication of a communication trigger associated with communication for a network; and transmit a sidelink message to the UE in response to reception of the sidelink synchronization signal that includes the indication of the communication trigger.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

FIG. 10A is a communication flow including communication between a UE and an aerial device to provide information to a network, in accordance with aspects presented herein.

FIG. 10B illustrates example aspects of a S-SSB, in accordance with aspects presented herein.

DETAILED DESCRIPTION

Figure 1:
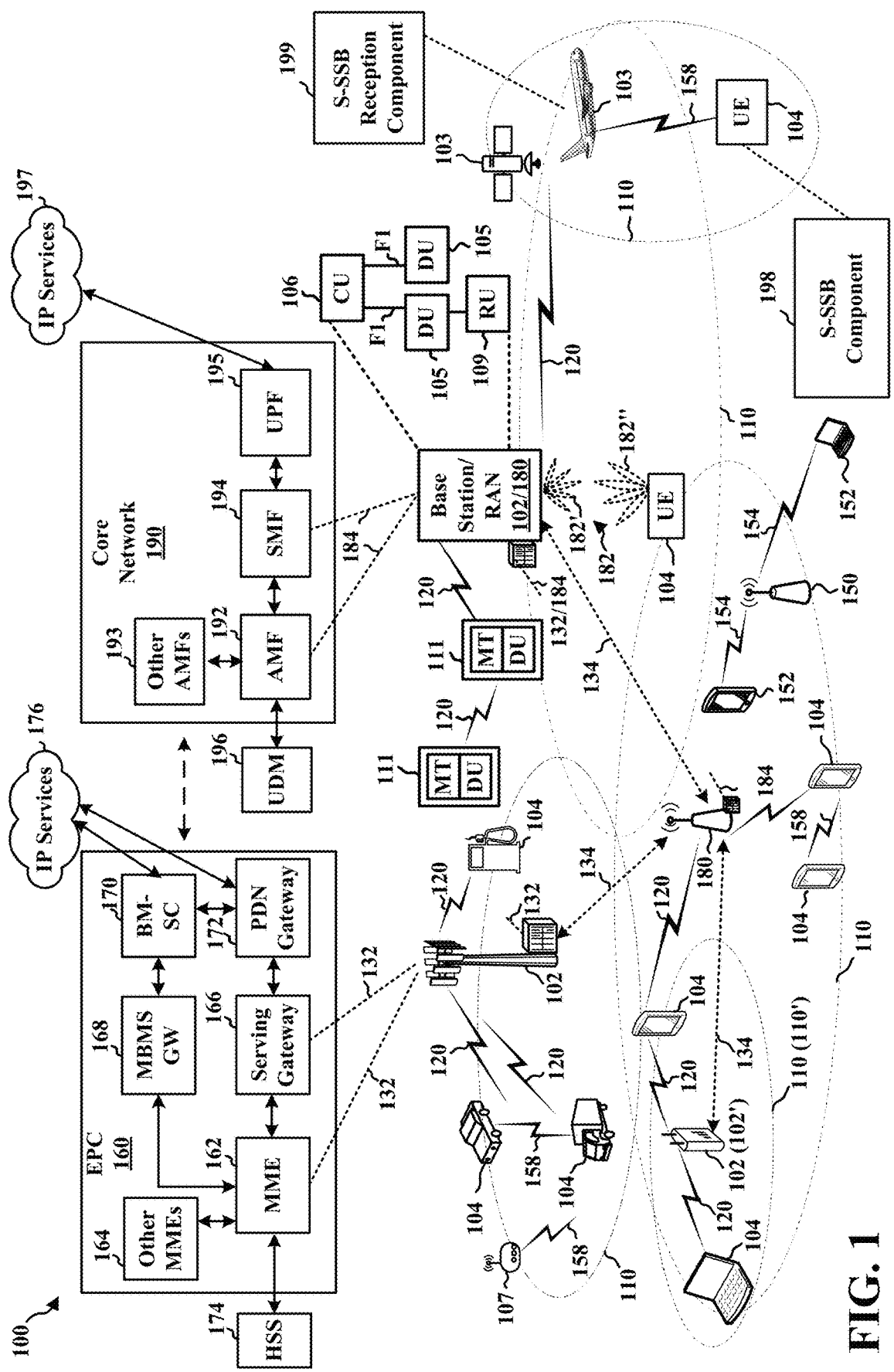
FIG. 1 is a diagram illustrating an example of a wireless communications system and an access network, in accordance with various aspects of the present disclosure.

To enable the transmission of communication from a mobile device (e.g., a mobile UE) at a location without terrestrial cellular coverage, a number of approaches may be utilized. The communication may include any of various types of communication. In some aspects, the communication may include an emergency message (e.g., an SOS message), a text message, a voice call, a public safety message, high priority communication, or other communication. In some aspects, the UE may transmit and/or receive communication with an aerial device, the communication being intended for a network, such as a terrestrial network (TN). The aerial device may relay the communication between a ground-based base station and the UE. In some aspects, the aerial device may relay the communication between a non-terrestrial network (NTN) platform, e.g. a satellite, and the UE. It is noted, due to the large pathloss between a UE and the NTN platform, it may be difficult for a UE to directly communicate with the NTN platform with a good enough signal quality. In this case, the aerial device may relay the communication between the UE and the NTN platform, as, in one example, the aerial device may have a better channel with the NTN platform, e.g. due to the aerial device's additional computational complexity and/or larger antenna(s).

Compared to satellite-based communications, an air-to-ground (ATG) system may relay communication between a UE and a network with a lower cost, a higher throughput, and/or a lower latency, according to some examples. For example, the aerial device may be located at a lower level than a satellite and may transmit and receive communication with a UE having less latency. In some aspects, ATG communication systems may allow for reduced deployment costs without launching satellites and may more easily incorporate software upgrades for ATG communication. According to one or more examples, applying ATG communication to relay between a UE and a network may involve less user assistance in operating a UE to communicate with the aerial device, e.g., without involving user positioned antennas. ATG communication may be supported by a device that provides wireless communication service within a cellular spectrum, in some aspects.

A transmission from the aerial device to the UE may have a large coverage area, which may at least partially overlap with a terrestrial network. Transmissions from the aerial device to the UE may cause interference to other communication in the terrestrial network, based on the large coverage area of the transmission that overlaps with the terrestrial network. If the link between the aerial device and the UE is based on Uu, the aerial device may periodically transmit a set of signals or information, e.g. SSB, MIB, or SIB1, in order to provide the information for the UE to access the communication network with the aerial device. Due to the altitude of the aerial device, the periodic transmissions may have a coverage area that overlaps with a terrestrial network, and the periodic transmissions may cause interference to the terrestrial network. Aspects presented herein provide for the aerial device to receive communication from the UE in a way that reduces the potential for interference by the aerial device to other communication, such as in a terrestrial network. In some aspects, the aerial device may receive the communication from the UE based on sidelink. In one example, the UE may proactively send a sidelink synchronization signal to the aerial device, e.g., a sidelink synchronization signal block (S-SSB) that indicates a communication trigger to the aerial device. The use of the S-SSB may enable the aerial device to discover the UE, e.g., without periodically transmitting a signal that may cause interference when the UE does not have a message for the aerial device to provide to the network. Additionally, in one example, the S-SSB may help to enable synchronization between the UE and the aerial device for further sidelink communication while also indicating the communication trigger for the S-SSB. The communication trigger may be an emergency event, a text message, a voice call, a public safety message, high priority communication, or other communication. The aerial device may provide an indication of the communication trigger for the UE to the network based on reception of the S-SSB from the UE. As an example, the UE may transmit the S-SSB including an indication of an emergency event, and the aerial device may provide an indication of the emergency event for the UE to the network (e.g., a terrestrial network or an NTN) in response to reception of the S-SSB from the UE. The use of the S-SSB to indicate the communication event to the aerial device enables the UE to provide the indication without performing sidelink discovery with the aerial device. Discovery transmissions from the aerial device may cause interference to a terrestrial network if the coverage area of the transmission overlaps with the terrestrial network. The use of the S-SSB to indicate the communication event helps to reduce interference from the aerial device to the terrestrial when a UE does not have communication to be relayed via the aerial device, by avoiding unneeded discovery transmissions from the aerial device. As well, the use of the S-SSB may also enable the UE and/or the aerial device to identify a timing adjustment and/or frequency compensation to apply for sidelink communication based on a propagation delay between the UE and the aerial device or based on a speed of the aerial device. As an example, the UE may transmit a set of S-SSBs with S-SSB IDs may map to different timing adjustment (TA)/frequency compensation (FC). The UE and the aerial device may identify a particular TA/FC based on an S-SSB identifier (ID) that is received by the aerial device. For example, the UE may identify a particular SSB-ID based on the TA/FC to be applied for transmitting the S-SSB. Similarly, the aerial device may identify a particular TA/FC based on the S-SSB ID of the S-SSB received from the UE by the aerial device. The UE or the aerial device may use the TA/FC to adjust future communication to compensate for the propagation delay and/or speed of the aerial device, which may improve the reliability of the communication between the UE and the aerial device.

Although aspects are described in connection with relays mounted to or traveling with aircraft or other aerial vehicles, a sidelink relay may provide UE-to-UE relay in non-vehicle mounted applications, in some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 3. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in some aspects, a UE 104 may include an S-SSB component 198 configured to transmit a sidelink synchronization signal in response to a communication trigger, the sidelink synchronization signal including an indication of the communication trigger to be provided to a network. The UE 104 may receive a sidelink response to the sidelink synchronization signal from an aerial device 103. The transmission of the S-SSB and the reception of the response may assist the UE in synchronizing with the aerial device in order to relay communication to a network, e.g., a terrestrial network. In some aspects, an aerial device 103 (e.g., which may function as an aerial relay) may include an S-SSB reception component 199 configured to receive, from a UE 104, a sidelink synchronization signal including an indication of a trigger for communication trigger associated with communication for a network, and to trigger a transmission of a sidelink message to the UE in response to reception of the sidelink synchronization signal that includes the indication of the communication trigger.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via anF1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
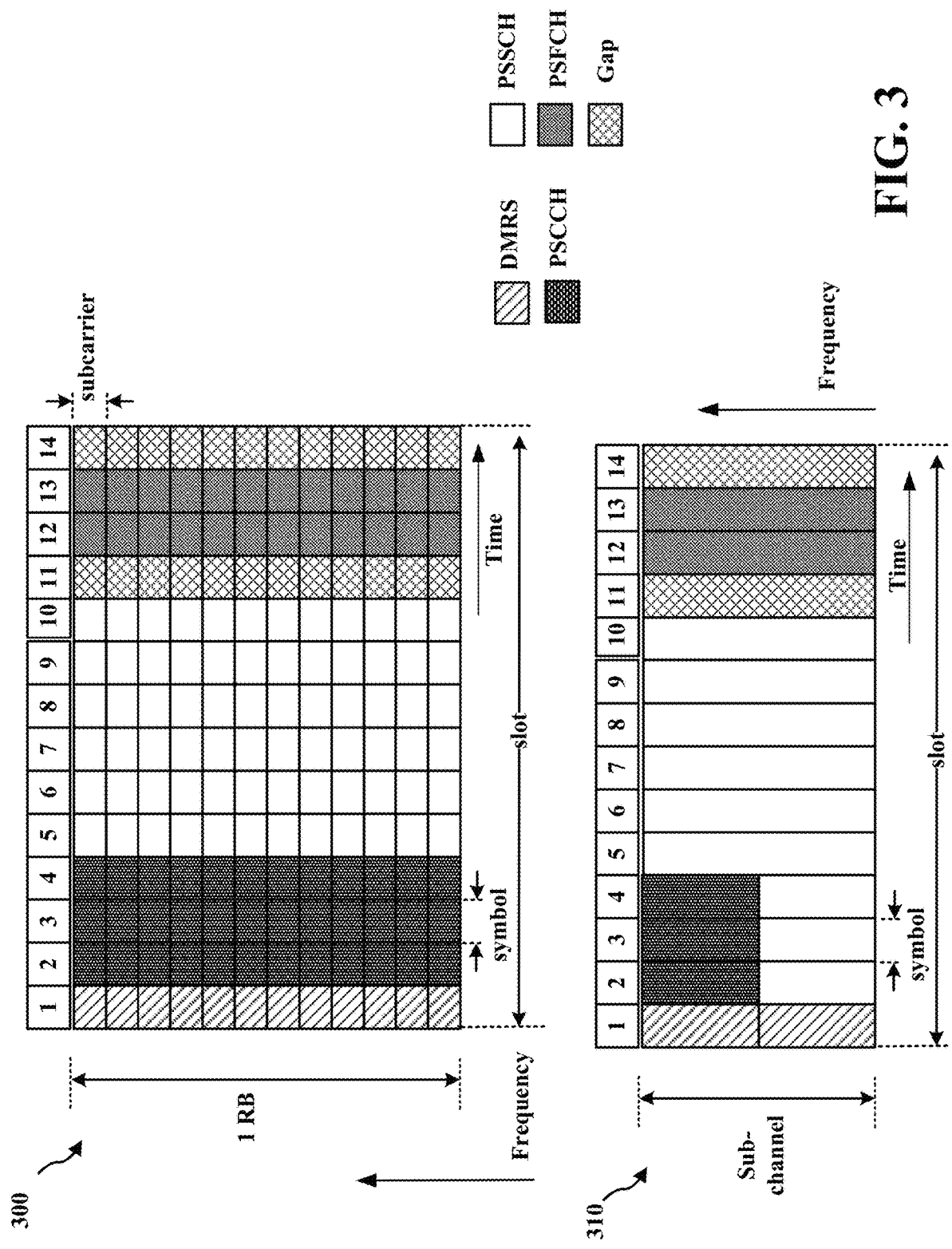
FIG. 3 illustrates example aspects of a sidelink slot structure, in accordance with various aspects of the present disclosure.

FIG. 3 includes diagrams 300 and 310 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 3 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 300 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 310 in FIG. 3 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples. Diagrams 300 and 310 illustrate PSCCH and PSSCH in a same slot. The PSCCH may be transmitted in an earlier part of the slot than the PSSCH. A first symbol may be repeated, e.g., for automatic gain control (AGC) settling.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 3, some of the REs may include control information in PSCCH and some REs may include demodulation RS (DMRS). At least one symbol may be used for feedback. FIG. 3 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. In other aspects, a slot may include PSCCH and PSSCH resources without resources for PSFCH, and a gap symbol may be provided after a last symbol of PSSCH. Data may be transmitted in the remaining REs, as illustrated. The data may comprise the data message described herein. The position of any of the data, DMRS, SCI, feedback, gap symbols, and/or LBT symbols may be different than the example illustrated in FIG. 3. Multiple slots may be aggregated together in some aspects.

Figure 4:
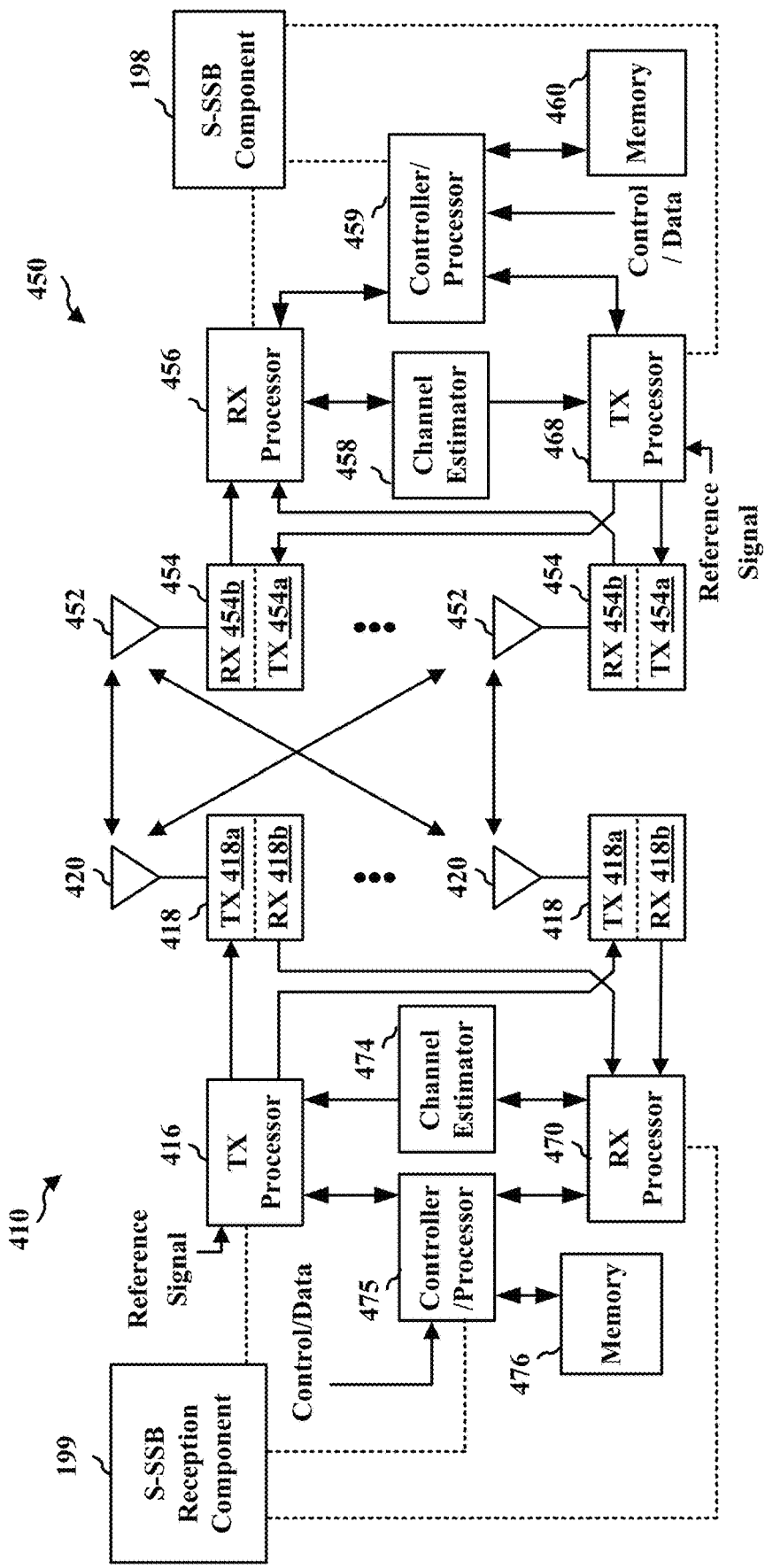
FIG. 4 is a diagram illustrating an example of a first device and a second device involved in wireless communication, in accordance with various aspects of the present disclosure.

FIG. 4 is a block diagram of a first wireless communication device 410 in communication with a second wireless communication device 450 based on sidelink. In some examples, the devices 410 and 450 may communicate based on sidelink communication. In some aspects, the communication may be based on a PC5 interface. In other aspects, the communication may be based on an access link, e.g., based on a Uu interface. In some examples, the device 410 may correspond to an aerial device 103 which may support communication with a base station with an access link and a UE with sidelink. Thus, in some examples, the device 450 may correspond to a UE 104, and in other examples, the device 450 may correspond to a base station. In examples in which the device 410 corresponds to an aerial device 103, at least one of the TX processor 416, the RX processor 470, and the controller/processor 475 may be configured to perform aspects in connection with the S-SSB reception component 199 of FIG. 1. In aspects in which the device 450 corresponds to a UE 104, at least one of the TX processor 468, the RX processor 456, and the controller/processor 459 may be configured to perform aspects in connection with the S-SSB component 198 of FIG. 1.

Packets may be provided to a controller/processor 475 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 416 and the receive (RX) processor 470 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 416 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the device 450. Each spatial stream may then be provided to a different antenna 420 via a separate transmitter 418*a*. Each transmitter 418*a* may modulate an RF carrier with a respective spatial stream for transmission.

At the device 450, each receiver 454*b* receives a signal through its respective antenna 452. Each receiver 454*b* recovers information modulated onto an RF carrier and provides the information to the receive (RX) processor 456. The TX processor 468 and the RX processor 456 implement layer 1 functionality associated with various signal processing functions. The RX processor 456 may perform spatial processing on the information to recover any spatial streams destined for the device 450. If multiple spatial streams are destined for the device 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 410. These soft decisions may be based on channel estimates computed by the channel estimator 458. The soft decisions are then decoded and deinterleaved to recover the data and control signals that were originally transmitted by device 410 on the physical channel. The data and control signals are then provided to the controller/processor 459, which implements layer 3 and layer 2 functionality.

The controller/processor 459 can be associated with a memory 460 that stores program codes and data. The memory 460 may be referred to as a computer-readable medium. The controller/processor 459 may provide demultiplexing between transport and logical channels, packet reassembly, deciphering, header decompression, and control signal processing. The controller/processor 459 is also responsible for error detection using an ACK and/or NACK protocol to support HARQ operations.

Similar to the functionality described in connection with the transmission by device 410, the controller/processor 459 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 458 from a reference signal or feedback transmitted by device 410 may be used by the TX processor 468 to select the appropriate coding and modulation schemes, and to facilitate spatial processing. The spatial streams generated by the TX processor 468 may be provided to different antenna 452 via separate transmitters 454a. Each transmitter 454a may modulate an RF carrier with a respective spatial stream for transmission.

The transmission is processed at the device 410 in a manner similar to that described in connection with the receiver function at the device 450. Each receiver 418b receives a signal through its respective antenna 420. Each receiver 418b recovers information modulated onto an RF carrier and provides the information to a RX processor 470.

The controller/processor 475 can be associated with a memory 476 that stores program codes and data. The memory 476 may be referred to as a computer-readable medium. The controller/processor 475 provides demultiplexing between transport and logical channels, packet reassembly, deciphering, header decompression, control signal processing. The controller/processor 475 is also responsible for error detection using an ACK and/or NACK protocol to support HARQ operations.

To enable the transmission of communication from a mobile device (e.g., a mobile UE) at a location without terrestrial cellular coverage, a number of approaches may be utilized. The communication may include any of various types of communication. In some aspects, the communication may include an emergency message (e.g., an SOS message), a text message, a voice call, or other communication. In one approach, the communication may be transmitted and delivered via a satellite communication (SatCom) system such as the Iridium system or another similar system. This approach may leverage the existing satellites that are already in operation, and may be associated with fast implementation and low deployment costs. However, there may be limited satellite coverage, and the communication may involve a specific type of UE that supports communication with the satellite. However, this approach may also be associated with strict antenna and TX power specifications. The operations may be human-assisted, where a skilled human may point the antenna toward the satellite to avoid blockage. Further, the approach may not be applicable to modern mobile devices with smaller form factors.

In another approach, the communication may be exchanged via a satellite-based non-terrestrial network (NTN), such as a 3GPP NTN. However, such NTNs may be associated with a high deployment cost to launch new satellites and install new gateways. In addition, it may be difficult for a smart phone device to autonomously connect to the NTN satellite due to the strict antenna and TX power specifications.

In another approach, the communication may be exchanged between a UE and a network via an aerial relay device. In some aspects, the aerial relay device may be provided at an aircraft. In some aspects, an aerial relay device may be provided via commercial aircraft to provide extended coverage for an area without a terrestrial base station. The air traffic provided by such aircraft may provide dense coverage, e.g., with aircraft within 50 km of each other. A typical cruising altitude may be on a scale of 10 kilometers (km) and may allow for line of sight (LOS) propagation to a device for over 200 km.

Figure 5:
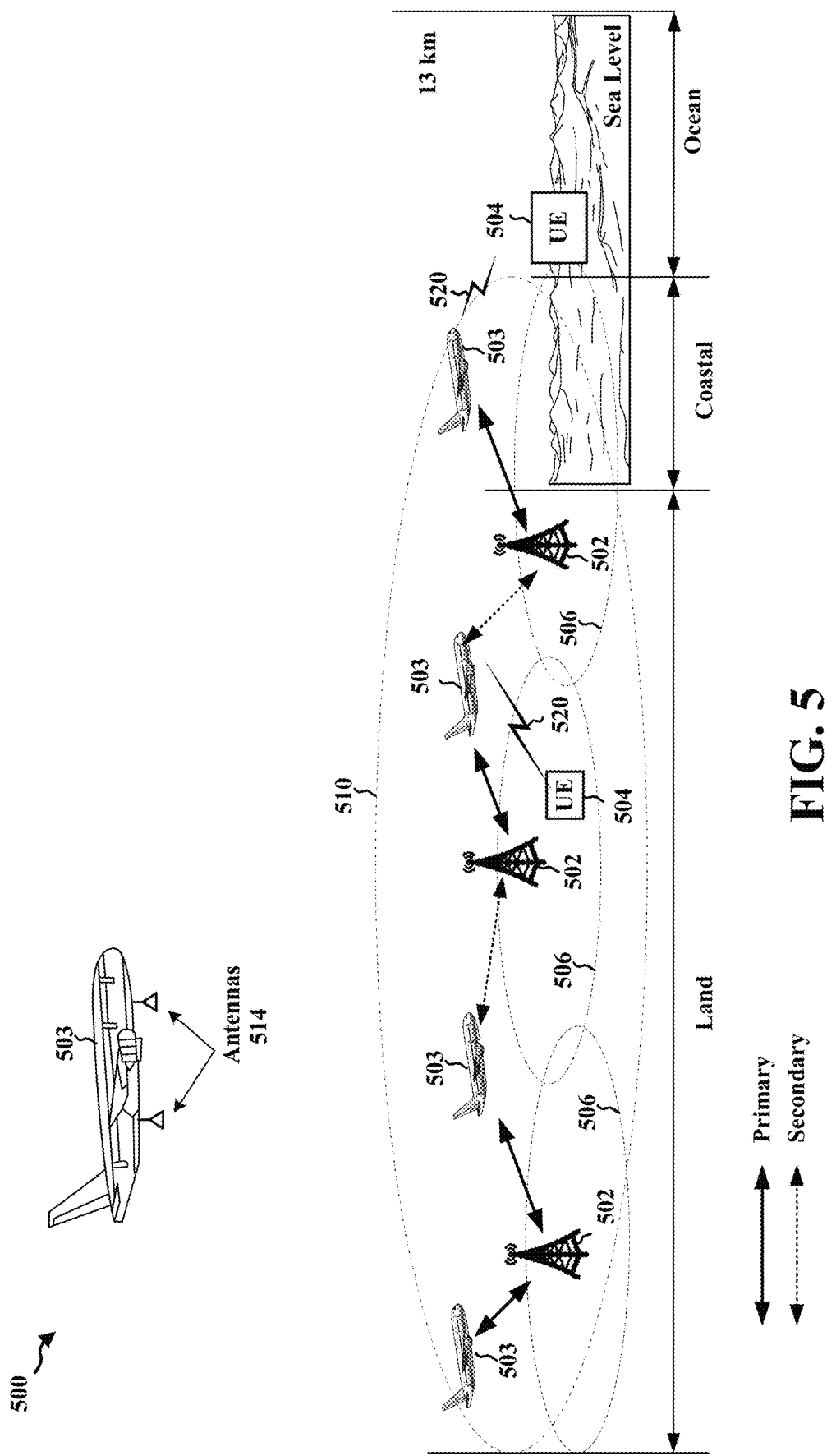
FIG. 5 illustrates example aspects of an air-to-ground (ATG) communication system, in accordance with aspects presented herein.

FIG. 5 is a diagram 500 illustrating wireless communications in an air-to-ground (ATG) communication system 510. ATG communications may take place between aerial devices 103 (e.g., aircraft-borne devices) in the air and ground-based base stations 502 or gateways. An aircraft-borne device may refer to a device that is inside, attached to, or traveling with an aircraft. As illustrated in FIG. 5, the aerial device 503 may exchange ATG communication with ground-based (or terrestrial) base stations 502 when traveling over land and/or coastal areas. The ground-based base stations 502 may be equipped with antennas angled (e.g., up-tilted or positioned to transmit upward) for communication with aerial devices in flight and the aerial devices 503 may be equipped with a server and antennas 514 at the bottom and/or on the sides of the aircraft for communication with ground-based base stations 502. The aerial device 503 may travel in a path that crosses the coverage area 506 of various ground-based base stations 502. The aerial device 503 may provide on-board communication components, such as internal Wi-Fi antennas or other radio access technologies (RATs) to allow passengers to communicate with a ground-based base station 102 based on ATG communication. The data traffic that may be carried over ATG communications may include aircraft passenger communications (e.g., communications associated with the passengers' own devices, which may be available en route on commercial flights, and additionally during takeoff, landing, climb and/or descent for business aviation), airline operation communications (e.g., aircraft maintenance information, flight planning information, weather information, etc.), and/or air traffic control communications (e.g., the ATG communications may serve as a backup to systems operating in aviation licensed bands). As described herein, the aerial devices may also exchange communication 520 with one or more UEs 504, and may relay communication between a base station 502 and a UE 504, in accordance with aspects presented herein. In addition, at least some of the approaches presented herein may be applied for aerial device to relay communication between a UE 504 and an NTN platform, e.g. a satellite.

Figure 6A:
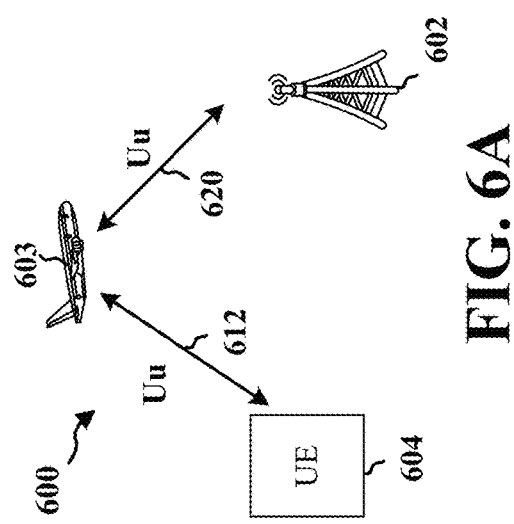
FIGS. 6A and 6B illustrate example options of relayed communication between a UE and a network via an aerial relay device, in accordance with aspects presented herein.
Figure 6B:
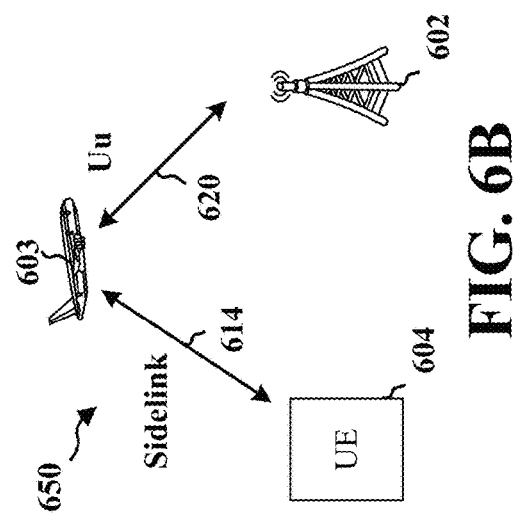

FIG. 6A is a diagram 600 illustrating a relay option for an aerial relay device 603, such as a commercial aircraft to relay messages or other communication between a UE 604 and a terrestrial base station 602. In some aspects, the aerial relay device 603 may relay emergency messaging between the UE 604 and the base station 602. In other aspects, the aerial relay device 603 may relay high priority messages between the UE 604 and the base station 602. In other aspects, the aerial relay device 603 may relay other communication, such as voice communication, between the UE 604 and the base station 602. In FIG. 6A, the aerial relay device 603 acts as a mobile base station relay to provide connectivity to a UE 604 that is out-of-coverage of a terrestrial network, and the aerial relay uses Uu over a radio link 612 to relay the communication to and from the UE 604. FIG. 6B is a diagram 650 illustrating a relay option for the aerial relay device 603 to relay communication between the UE 604 and the terrestrial base station 602 using sidelink for the radio link 614 between the aerial relay device 603 and the UE 604. In some aspects, the terrestrial base station 602 may operate as a donor base station, and the aerial relay device 603 may operate as an IAB node. The aerial relay device 603 may be referred to by various names including an aerial mobile relay, an aerial relay node, an aircraft mounted relay, an aircraft-borne relay, among other examples. In both FIG. 6A and FIG. 6B, it is possible that the communication between the aerial relay device 603 and the terrestrial base station 602 may apply a standardized air interface, e.g. 3GPP Uu interface, and/or a non-standardized air interface. The base station 602 may be a ground-based base station. The link between the aerial device 603 and the base station 602 (or a gateway, as illustrated in the example in FIG. 7) may be referred to as an air-to-ground link (ATG link), and the communication over the link may be referred to as ATG communication.

Compared to satellite-based communications (e.g., via an Iridium-like SatCom system or a satellite-based 3GPP NTN, which, for example, may be used when the aircraft is above an ocean), applying ATG communications to relay between a UE and a network may be associated with a lower cost, a higher throughput, and/or a lower latency, according to some examples. For example, the aerial device is located at a lower level than a satellite and may transmit and receive communication with a UE having less latency. In some aspects, ATG communication systems may allow for reduced deployment costs without launching satellites and may incorporate software upgrades for ATG communication. Applying ATG communication to relay between a UE and a network may involve less user assistance in operating the device, e.g., not involving user positioned antennas, and may be incorporated into a device that provides wireless communication service within a cellular spectrum.

As described in connection with FIG. 3, a sidelink slot structure may include resources for PSSCH, PSCCH, and PSFCH. A control channel (e.g., PSCCH) may include information (e.g., sidelink control information (SCI)) for decoding the data channel, such as information about time and/or frequency resources that are allocated for the data channel transmission.

Figure 7:
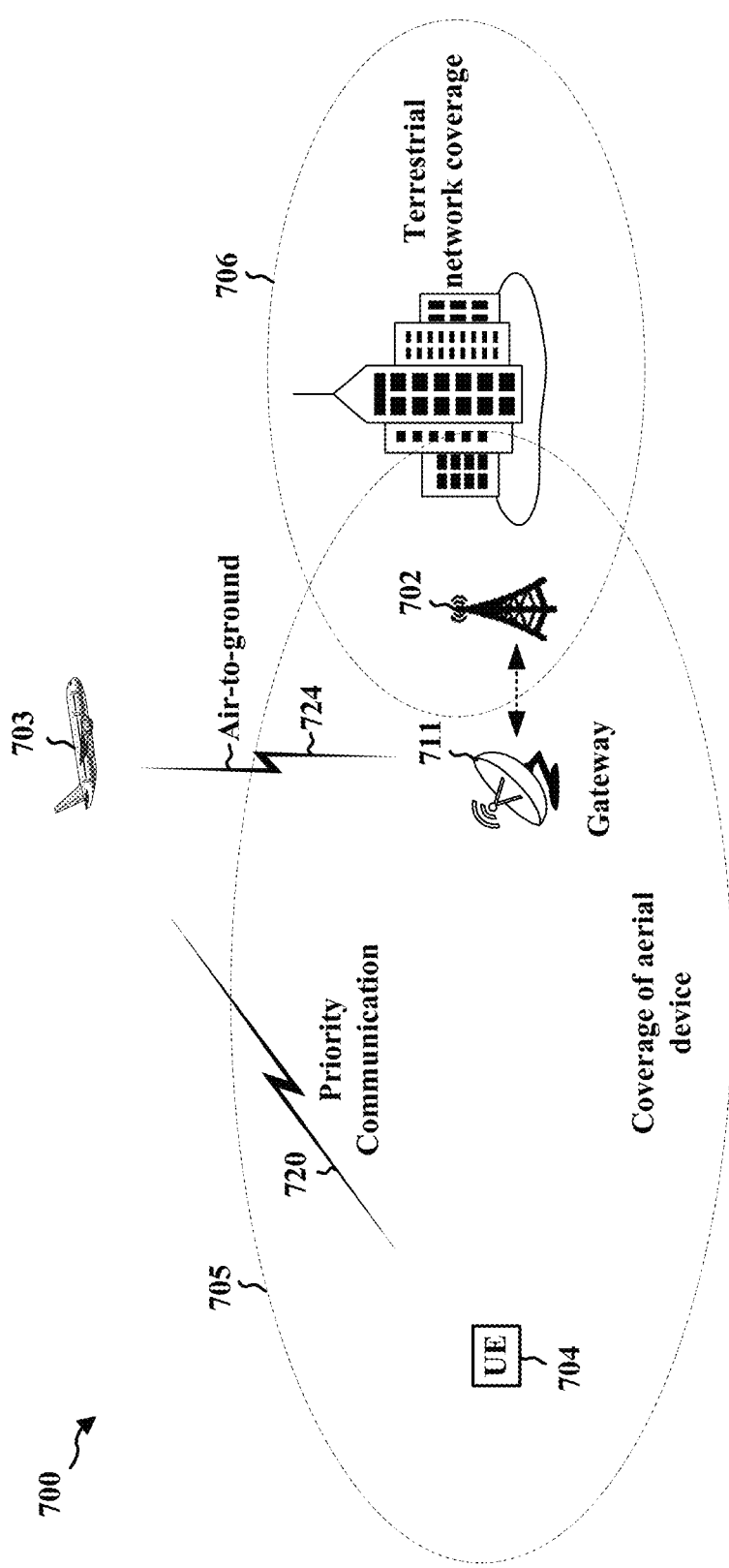
FIG. 7 illustrates example aspects of an ATG communication system, in accordance with aspects presented herein.

FIG. 7 illustrates an example diagram 700 of a UE 704 outside of terrestrial network (TN) coverage 706 that may support wireless communication service via an aerial device 703, such as an aircraft. The wireless communication may be high priority communication, or a particular type of communication. In some aspects, the communication may include an emergency message from the UE 704. In some examples, the aerial device 703 may provide an SOS-type of service in which wireless communication from the UE 704 may be relayed via the aerial device 703 to the network (NW) and vice versa. As illustrated in FIG. 7, in some aspects, the aerial device may communicate with a terrestrial network via a gateway device 711.

As one example, an aerial device at an airplane may communicate with a terrestrial network (e.g., the terrestrial base station 702) via the gateway 711 on the ground for ATG communication based on a Uu interface or a wireless communication technology for aerial devices. As described in connection with FIG. 5, the aerial device may include an antenna attached, or installed, at a bottom of an aircraft such as an airplane. In some aspects, the UE 704 and the aerial device 703 may receive a GNSS reliably. In some aspects, the ATG system may enable priority communication for a UE 704 outside of coverage of a terrestrial network to be relayed at an airplane, e.g., separate from satellite based NTN communication. The ATG system may enable the relay of communication for a UE independent of satellite deployment, in some aspects.

In some aspects, the antenna at an aerial device may have reduced, or no, directionality. In such aspects, a transmission from the aerial device to the UE may have a large coverage area 705, which may at least partially overlap with a terrestrial network. As the wireless communication (which may be a high priority communication or emergency message) from the UE 704 to the aerial device 703 may be infrequent, aspects presented herein help to reduce interference from the aerial device to other devices (e.g., such as devices in a terrestrial network) during times when there is no communication 720 from an out-of-coverage UE 704 to the aerial device 703.

If a Uu link is used for the communication 720 between the UE 704 and the aerial device 703 (e.g., such as in the example in FIG. 6A), the aerial device periodically transmits a set of signals or information, e.g. SSB, MIB, or SIB1, in order to provide the information for the UE 704 to access the communication network. If the UE 704 does not have communication 720 to transmit to the aerial device 703, the periodic transmissions from aerial device 703 may cause interference to the terrestrial network, e.g., provided by the terrestrial base station 702.

As described in connection with the example in FIG. 6B, in some aspects, the link between the UE 704 and the aerial device 703 may be a sidelink relay link, e.g., and the aerial device 703 may relay the communication 720 that is received on a sidelink with the UE 704 to the terrestrial network, e.g., via the gateway 711. In some aspects, the communication 724 with the gateway may be based on a Uu link. The link between the aerial device 703 and the gateway 711 may be referred to as an ATG link. Such sidelink to Uu relay of communication may support coverage extension for communication with a UE 704 that is out of coverage of a terrestrial network. The UE 704 may use a configured sidelink resource pool (e.g., of time and/or frequency resources available for sidelink communication) to transmit and/or receive sidelink communication (e.g., 720) with the aerial device 703. The use of sidelink for the communication 720 may enable the aerial device 703 to skip the periodic transmission of Uu signals or information, such as SSB, MIB, or SIB1, when there are no UEs with communication to be relayed.

Figure 8:
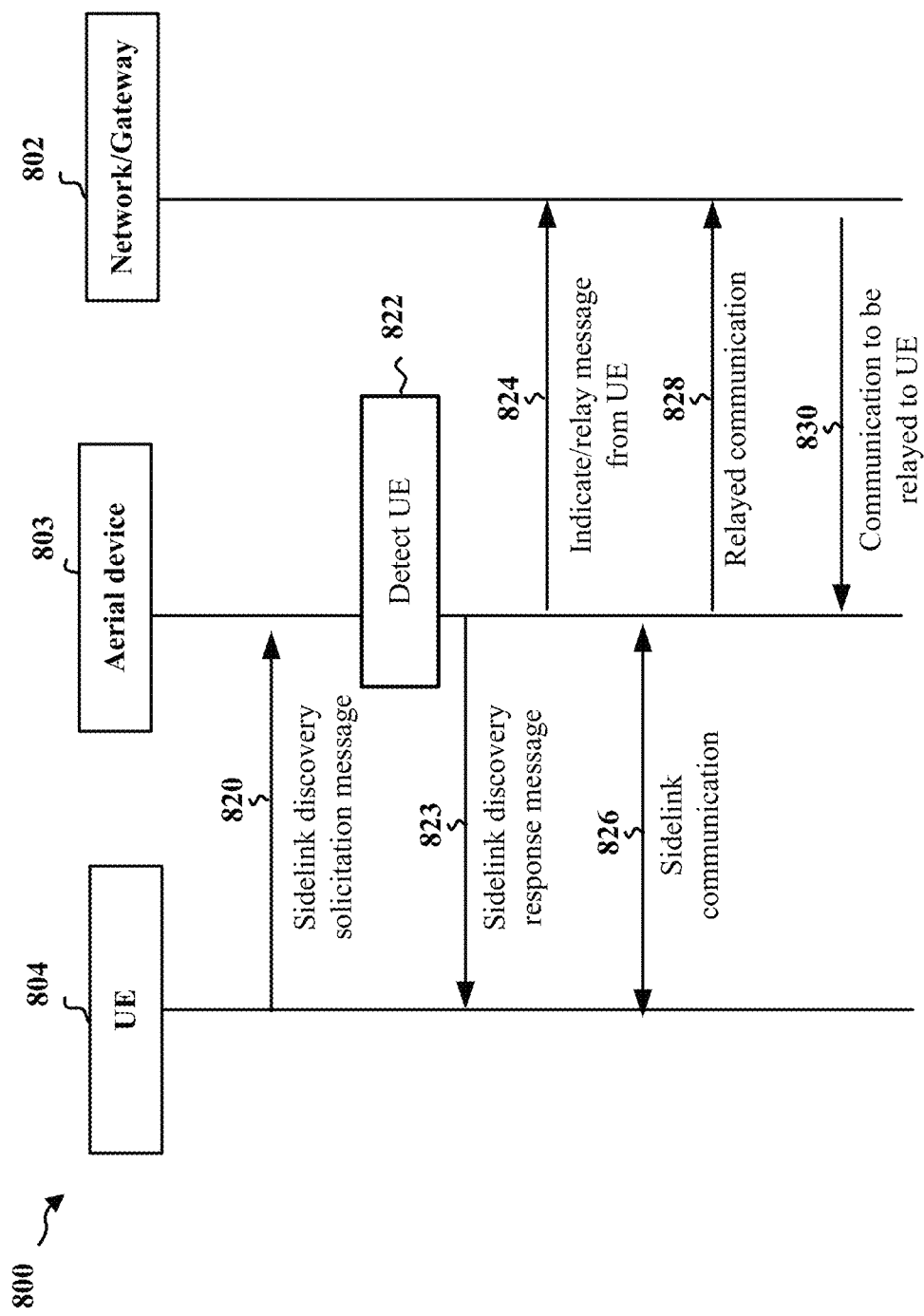
FIG. 8 is a communication flow including communication between a UE and an aerial device to provide information to a network, in accordance with aspects presented herein.

FIG. 8 illustrates an example communication flow 800 between a UE 804, an aerial device 803, and a network 802 (e.g., via a gateway), in which the aerial device 803 relays sidelink communication from the UE 804 to the network 802, e.g., a ground base station. The UE may identify communication to transmit to an aerial device. As an example, the UE may detect an emergency condition, or may have high priority communication to transmit to a network. The UE 804 may transmit a sidelink discovery solicitation message, e.g., as a broadcast, to announce its presence and to indicate that it has communication to transmit over sidelink. The UE 804 may indicate a type of communication or a type of message in the sidelink discovery message 820. As an example, the UE 804 may indicate that it has an emergency message to transmit, may indicate that it has a high priority message to communicate, or may indicate voice communication to transmit to a network. In some aspects, the service or type of message may be indicated by one or more identifiers (ID(s)) in the sidelink discovery solicitation message (e.g., 820).

The aerial device 803 detects the UE, at 822, based on reception of the discovery announcement or solicitation message (e.g., 820). In some aspects, the aerial device 803 may transmit a discovery response message 823 over sidelink to the UE 804. In some aspects, the sidelink discovery may be based on a 3GPP model A discovery procedure in which the UE, with communication to transmit, announces its presence and requests a response from other sidelink devices that support communication with the UE. At 824, the aerial device 803 may relay information from the UE 804 to the network, e.g., to a terrestrial network 802. The aerial device 803 may indicate the message or type of message from the UE 804 to the network, at 824. In some aspects, the UE 804 and the aerial device 803 may exchange additional information 826 over sidelink following the sidelink discovery, at 820 and 823. The aerial device 803 may relay communication from the UE 804 to the network 802, at 828, and may receive communication from the network 802 to relay to the UE 804 over sidelink. For example, the sidelink communication (e.g., 826) exchanged between the aerial device 803 and the UE 804 may include communication between the network 802 and the UE 804 via the aerial device 803. For example, the network 802 may provide communication 830 to the aerial device 803 to be transmitted in sidelink communication 826 to the UE 804.

If the UE 804 does not have communication to transmit to the aerial device 803, the aerial device will not cause interference to other devices, e.g., in the coverage of the bases station, because the UE 804 may not transmit a solicitation message, and the aerial device 803 does not transmit a transmission to the UE 804. The absence, or reduction, of transmissions from the aerial device may avoid, or reduce, interference to a terrestrial network within coverage of the aerial device.

The example in FIG. 8 is merely one example to illustrate the concept of the aerial device relaying communication between the UE to a terrestrial network. As another example, instead of using a discovery procedure, the UE 804 may transmit a sidelink communication message (e.g., at 820) to the airplane, and the airplane may respond with a sidelink communication message or sidelink signal (e.g., at 823) transmitted to the UE 804 as a response to the sidelink communication message from the UE.

In some aspects, upon detecting the existence of the UE 804, at 822, the aerial device 803 and the network 802 and/or the aerial device 803 and the UE 804 may exchange additional messages. For example, the UE 804 and the aerial device 803 may exchange additional messages in order to establish a connection between the UE and the aerial device (e.g., a sidelink connection). The aerial device 803 and the network 802 may exchange additional messages in order to communicate between the aerial device 803 and the network 802.

Synchronization between the UE 804 and the aerial device 803 may enable the aerial device 803 to receive sidelink messages from the UE 804 and may enable the UE 804 to receive communication from the aerial device 803. In some aspects, the UE 804 and the aerial device 803 may be synchronized with a GNSS and may derive the same sidelink synchronization-related information (e.g. a direct frame number) locally, based on the GNSS timing that is commonly known by the UE 804 and the aerial device 803. FIG.

Figure 9:
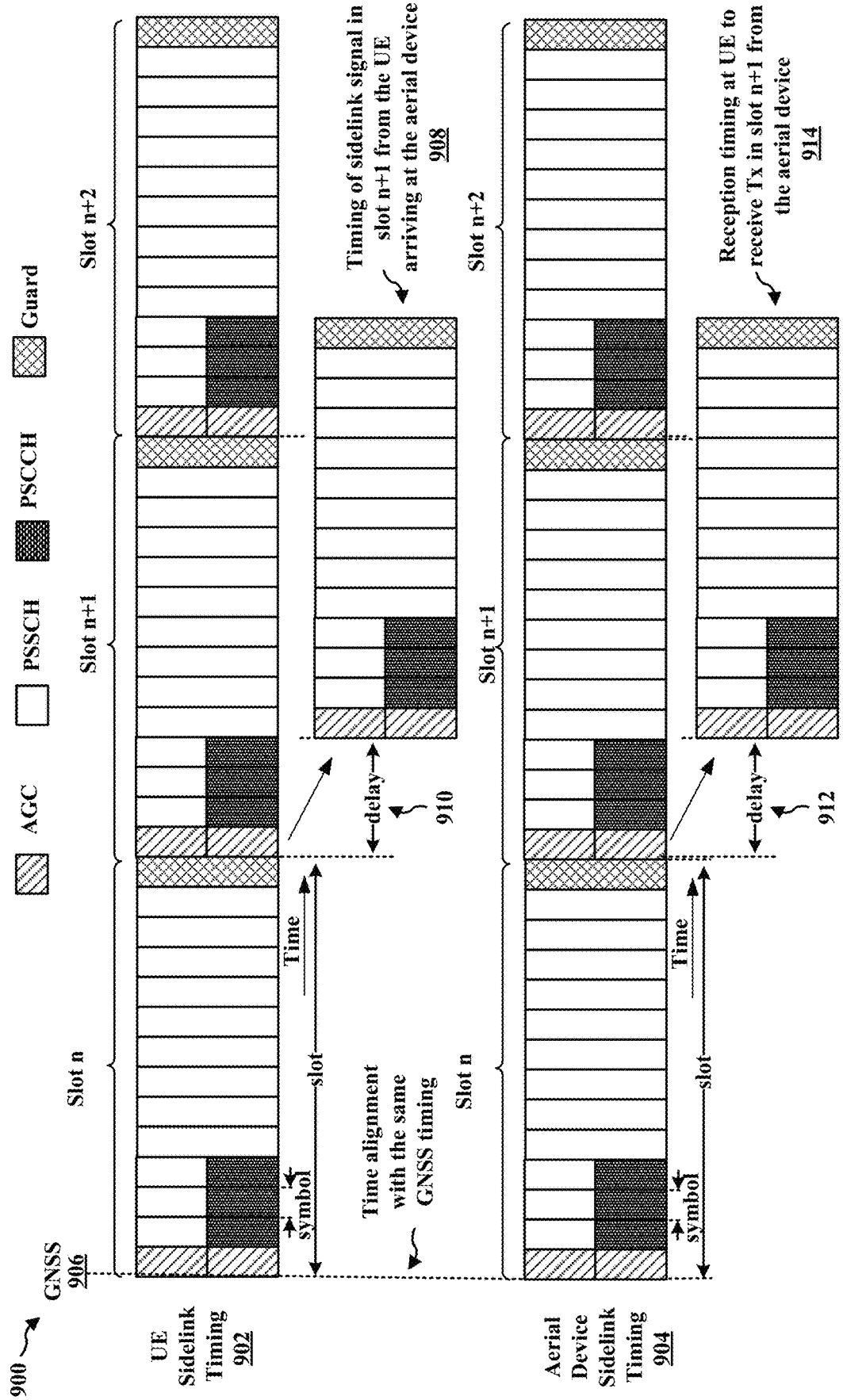
FIG. 9 illustrates an example timing diagram illustrating timing relationships between a UE and an aerial device, in accordance with aspects presented herein.

9 illustrates a timing diagram 900 showing a UE sidelink timing 902 and an aerial device sidelink timing 904 that are both aligned with a GNSS reference timing 906. FIG. 9 also shows a time-domain asynchronization between the sidelink timing of the UE (e.g., 902) and the aerial device (e.g., 904) and the reception time (e.g., 908) of a sidelink signal from the UE that is received at the aerial device due to the large signal propagation delay 910 from the UE to the airplane.

The distance between the UE and the aerial device (e.g. up to 50/100 km), may lead to a signal propagation delay from the UE to the airplane that can be quite large (e.g. up to 0.16/0.33 ms). The propagation delay introduces asynchronization between the sidelink signal timing for signals arriving at the aerial device from the UE and the aerial device's own sidelink timing (e.g., 904), which may result a sidelink reception failure at the aerial device. A similar asynchronization issue may also be present for reception timing 914 of sidelink signals from the aerial device at the UE with a delay 912. Additionally, or alternatively, asynchronization may be introduced due to a speed of the aerial device that leads to a Doppler shift between the UE and the aerial device. The Doppler shift may introduce a frequency-domain asynchronization issue between the aerial device and the UE.

Aspects presented herein enable a UE to indicate its presence to an aerial device and/or to indicate an event or a communication type to the aerial device, by transmitting a sidelink synchronization signal block (S-SSB) for reception by the aerial device. The aerial device may further use the S-SSB for follow-up communications between the UE and the aerial device. FIG. 10A illustrates an example communication flow 1000 between a UE 1004 and an aerial device 1003 including the transmission of an S-SSB 1020. At 1018, the UE 1004 detects the occurrence of an event. The event may include an emergency condition or a request to send an emergency message. The event may include having a high priority message to communicate with a network. The event may include a voice call. The event may also include other events that trigger the UE 1004, which may be outside of coverage of a terrestrial network, to attempt to transmit communication to an aerial device 1003 and/or a gateway/ network 1002.

Upon detecting the even, at 1018, the UE 1004 transmits one or more S-SSB(s) 1020. FIG. 10B illustrates example aspects of an S-SSB 1050. The S-SSB may include a sidelink synchronization signal (SLSS) and a master information block sidelink (e.g., MasterInformationBlockSidelink). The MasterInformationBlockSidelink may be transmitted over a physical sidelink broadcast channel (PSBCH). The SLSS may contain a sidelink primary synchronization signal (S-PSS) and a sidelink secondary synchronization signal (S-SSS). Each SLSS ID may correspond to a particular candidate sequence used for the S-PSS and the S-SSS. The PSBCH may occupy 11 resource blocks (e.g., 132 subcarriers), and the S-PSS and S-SSS may occupy 127 subcarriers.

In some aspects, the S-SSB 1020 may indicate the SOS event. As an example, reserved bit in the sidelink MIB (e.g., MasterInformationBlockSidelink) comprised in the SSB may indicate an event, such as an emergency event, high priority communication, a type of communication, a type of message, etc.

Alternatively, or additionally, the indication may be based on a sidelink synchronization signal identifier (SLSS-ID) that is used to indicate the event. For example, one or more SLSS-IDs may be configured to be associated with particular events. The UE may indicate the occurrence of a particular event based on the SLSS-ID of the S-SSB that the UE 1004 transmits to the aerial device 1003.

The aerial device 103 may be authorized and authenticated to monitor for such event messages from UEs. As an example, the aerial device 1003 may be an airplane mounted device that is authorized and authenticated to monitor for messages for an SOS service. The airplane mounted device may continuously or periodically monitor for a set of configured S-SSB resource(s) that are configured for the SOS service. An SOS service is merely one example of a type of event for which the aerial device may monitor.

In response to detecting an S-SSB indicating a particular event, the aerial device detects the existence, or presence, of the UE 1004, at 1022. If the aerial device 1003 is monitoring for S-SSBs associated with an SOS service, the reception of such an S-SSB may enable the aerial device 1003 to detect the presence of an SOS UE (e.g., a UE sending an SOS message).

The aerial device 1003 may indicate the event, or provide the message or information from the UE 1004, to the network 1002, at 1024, in response to detecting the UE and/or the event, at 1022. As described in connection with FIG. 8, the UE 1004 and the aerial device 1003 may continue to exchange sidelink communication, at 1026. The aerial device may receive one or more sidelink communication messages from the UE 1004 and may relay the communication, or information about the communication, to the network 1002.

Figure 11:
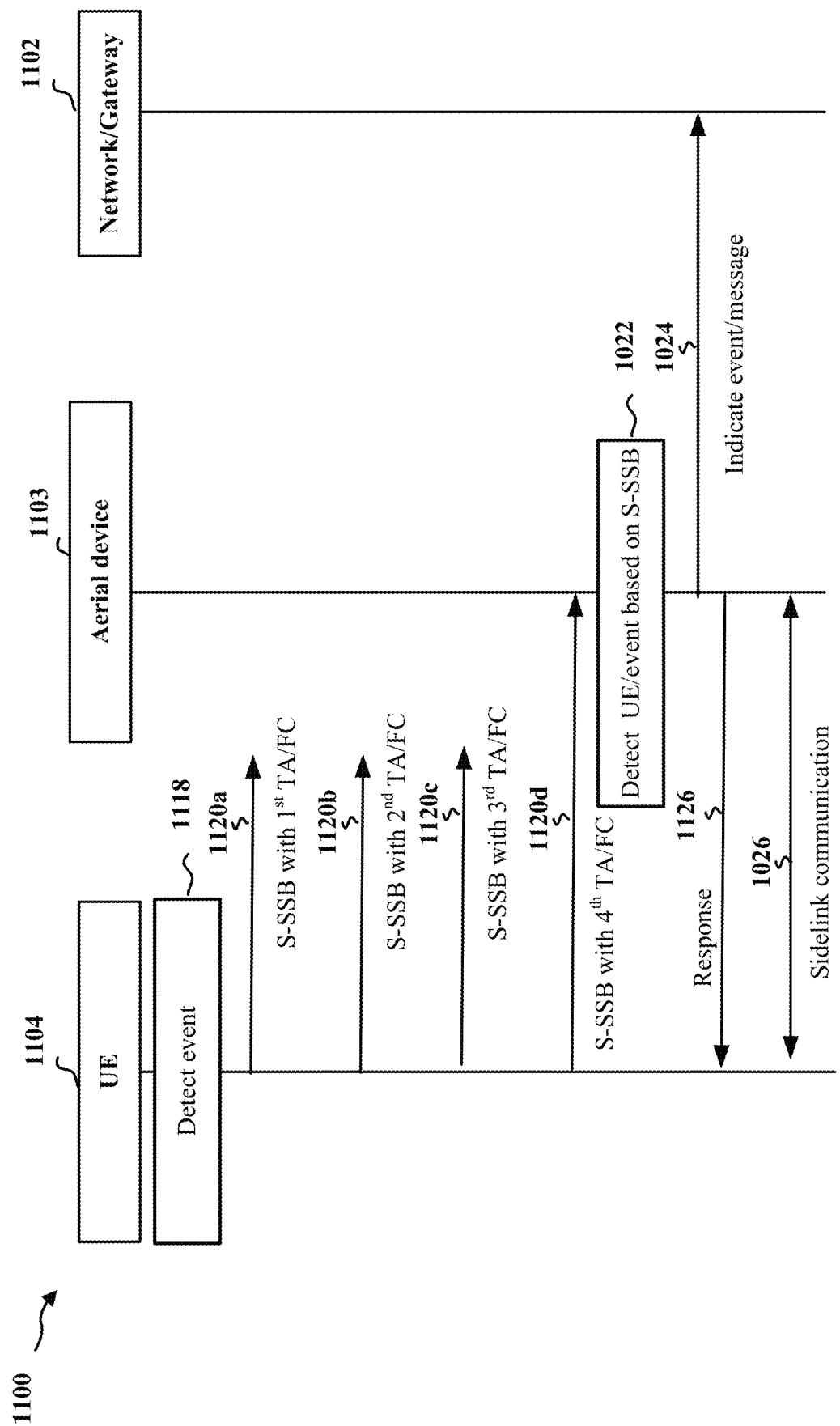
FIG. 11 is a communication flow including communication between a UE and an aerial device to provide information to a network, in accordance with aspects presented herein.

In some aspects, the UE 1104 may transmit S-SSBs sequentially, with an adjusted SL TAs/frequency compensation (FC) for each of the transmitted S-SSBs. FIG. 11 illustrates an example communication flow 1100 between a UE 1104, an aerial device 1103, and a network 1102 that includes the detection of the UE 1104 by the aerial device 1103 based on an S-SSB transmission. As illustrated in FIG. 11, in response to the communication event detected at 1118, the UE 1104 may sequentially transmit S-SSBs with different TA/FC, e.g., at 1120a, 1120b, 1120c, and 1120d. In some aspects, the 1st TA/FC may be TA=0 or FC=0. In other aspects, the 1st TA/FC may be an initial TA value or an initial FC value. The sequential transmissions of the S-SSB may be transmitted with increasing TAs or with increasing FCs. FIG. 11 illustrates that the S-SSB 1120d is received by the aerial device. The other aspects of FIG. 11 may be the same as in FIG. 10A, and are represented with the same reference number. As illustrated at 1126, the aerial device 1103 may transmit a response 1126 to the UE 1104. The response may be an ACK, or other message that indicates to the UE 1104 that the aerial device received the S-SSB. In some aspects, the UE 1104 may stop the sequential transmission of the S-SSBs or may adjust the transmission of S-SSBs based on the response 1126.

Figure 12:
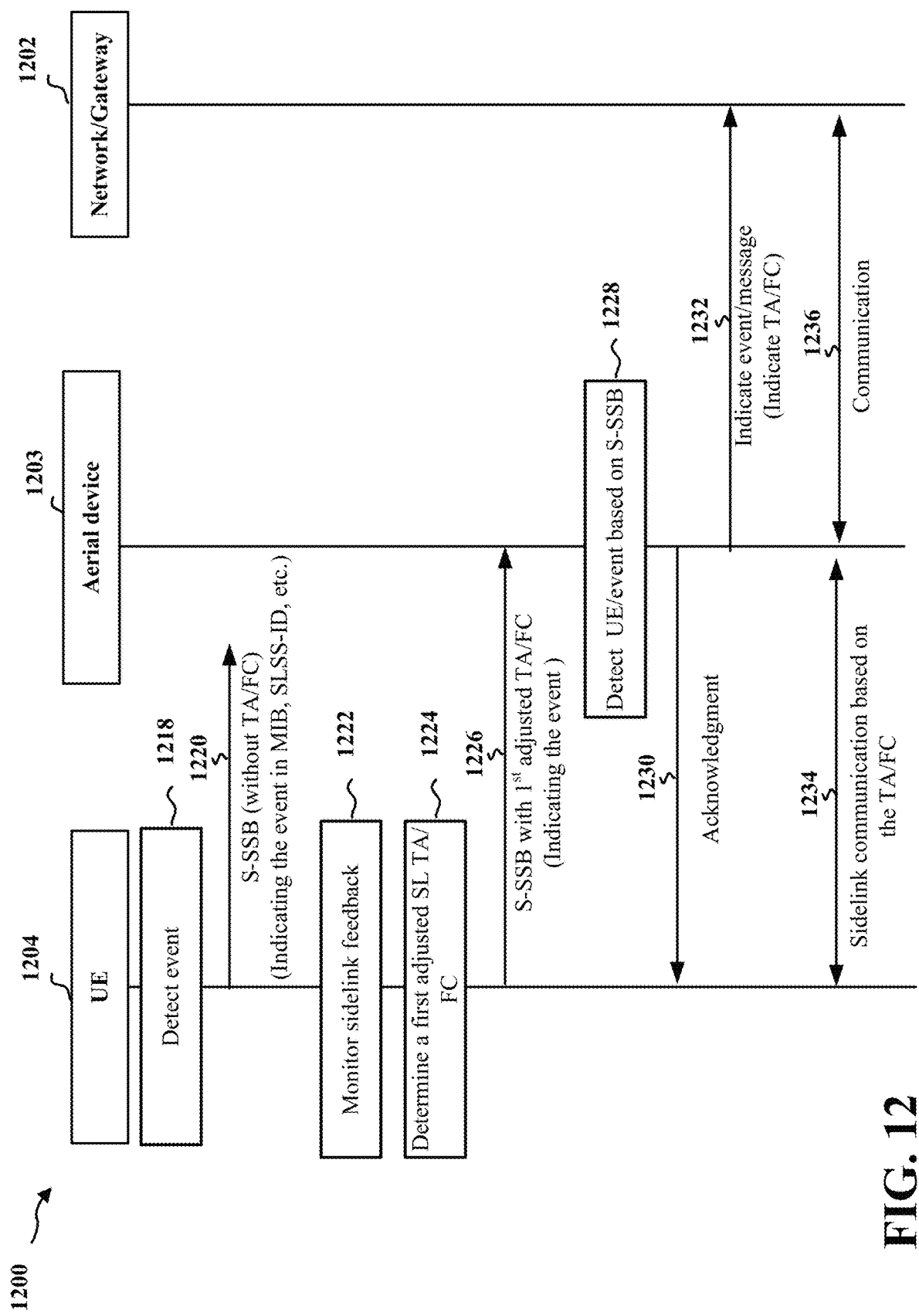
FIG. 12 is a communication flow including communication between a UE and an aerial device to provide information to a network, in accordance with aspects presented herein.

FIG. 12 illustrates an example communication flow 1200 between a UE 1204, an aerial device 1203, and a network 1202 that includes the detection of the UE 1204 by the aerial device 1203 based on an S-SSB transmission. Similar to FIG. 11, the UE 1204 detects the occurrence of an event (e.g., which may be a communication event), at 1218, that triggers the UE 1204 to transmit at least one S-SSB 1220 for reception by an aerial device 1203. The UE 1204 may send a first S-SSB 1220 without any timing adjustment (TA) and/or frequency compensation (FC) at time t. The UE 1204 monitors for a response (e.g., sidelink feedback) in response to the S-SSB 1220, at 1222. At 1224, the UE may determine an TA and/or FC for a second S-SSB transmission, e.g., based on an absence of a response/feedback to the first S-SSB transmission, at 1220. The UE 1204 transmits a second S-SSB 1226 with a first TA/FC. For example, the first TA may include value of $\mu$ ms at time t+T If no response is received, the UE may continue and transmit a third S-SSB with a TA value of $2*\mu$ ms at time t+2T, and so forth for any number of S-SSB transmissions. The time domain TA adjustment behavior allows the UE to attempt to connect to aerial devices at different distances or altitudes. As an example, the UE may first attempt to connect to a closer airplane (e.g., by transmitting the S-SSB 1220 without TA/FC) and may then attempt to connect to a further away airplane (e.g., by transmitting the S-SSB 1226 with a TA/FC). As an example, an airplane at a higher altitude and/or a larger distance may receive the S-SSB if the UE applies a larger sidelink TA value for its transmitted S-SSB. Although the example is described for an airplane, the concepts presented herein are not limited to application with airplanes, and the UE may attempt to transmit the S-SSB to various types of aerial devices. In another example, the first FC may include value of $\mu$ Hz at time t+T. If no response is received, the UE may continue and transmit a third S-SSB with a FC value of $2*\mu$ Hz at time t+2T, and so forth for any number of S-SSB transmissions. The frequency domain FC adjustment behavior allows the UE to attempt to connect to aerial devices with different velocities. In some aspects, the maximal FC value to be applicable at the UE may be related to the UE-estimated maximal relative velocity between the UE and the aerial device.

In some aspects, the UE 1204 may stop adjusting the SL TA/FC value used for sending the S-SSB, in response to receiving an acknowledgement 1230 from an aerial device, which acknowledges the reception of the SOS indication. The acknowledgement 1230 may be an ACK signal or a message (e.g. over PSBCH/PSCCH/PSSCH/PSFCH) in response to the aerial device detecting the UE based on reception of the S-SSB, at 1228.

The UE 1204 may use the corresponding sidelink TA/FC value, e.g. the sidelink TA/FC used for transmitting the S-SSB that was acknowledged by an aerial device 1203, for communications 1234 with the aerial device 1203. The aerial device 1203 may indicate the event or message to the network 1202, at 1232. The aerial device 1203 may relay communication between the UE 1204 and the network 1202, e.g., as illustrated at 1234 and 1236.

In some aspects, the UE may indicate the TA/FC used in a particular S-SSB transmission, e.g. by using one or multiple configured mapping table(s) that map an association between the SLSS IDs of the S-SSB and the corresponding TA/FC ranges. Based on the TA/FC value and the mapping table, the UE may determine the SLSS ID, and may use the SLSS ID to determine the sequence(s) used for transmitting S-PSS/S-SSS in the particular S-SSB transmission.

Upon successfully receiving the S-SSB, the aerial device 1203 may derive the TA/FC range of the UE 1204 based on the received/detected SLSS ID and using the same mapping table(s) that map an association between SLSS IDs and TA/FC ranges. The aerial device may use the derived TA/FC range for its future sidelink transmissions to the UE 1204. As an example, the aerial device 1203 may apply the same TA/FC associated with the received S-SSB for the aerial device's sidelink transmissions towards the UE 1204, e.g., at 1230 and/or 1234.

In some aspects, the aerial device 1203 may further indicate the derived TA/FC to network 1202, e.g., at 1232, optionally together with its own location. The location of the aerial device 1203 and/or the TA/FC for the UE 1204 may allow the network 1202 to identify a searching area for the UE 1204, which is an SOS UE, for example.

In some aspects, based on the event indication, e.g. carried by one or multiple reserved bit in the sidelink MIB, the S-SSB receiver (i.e. aerial device 1203) may become aware that the SLSS ID refers to the TA/FC of the UE's S-SSB TX.

In some aspects, if the UE 1204 does not indicate the TA/FC of its S-SSB TX, the UE 1204 may apply a sidelink timing delay and/or a sidelink FC to monitor/receive a sidelink response message, e.g., 1230, corresponding to an S-SSB TX from the UE. The delay/FC may be based on the TA/FC value used in the S-SSB TX from the UE 1204.

In one example, the delay/FC may be equal to the TA/FC value used in the S-SSB TX. The use of a corresponding delay/FC allows the UE 1204 to receive a response without the need for the aerial device 1203 to adjust its sidelink TA/FC.

Figure 13:
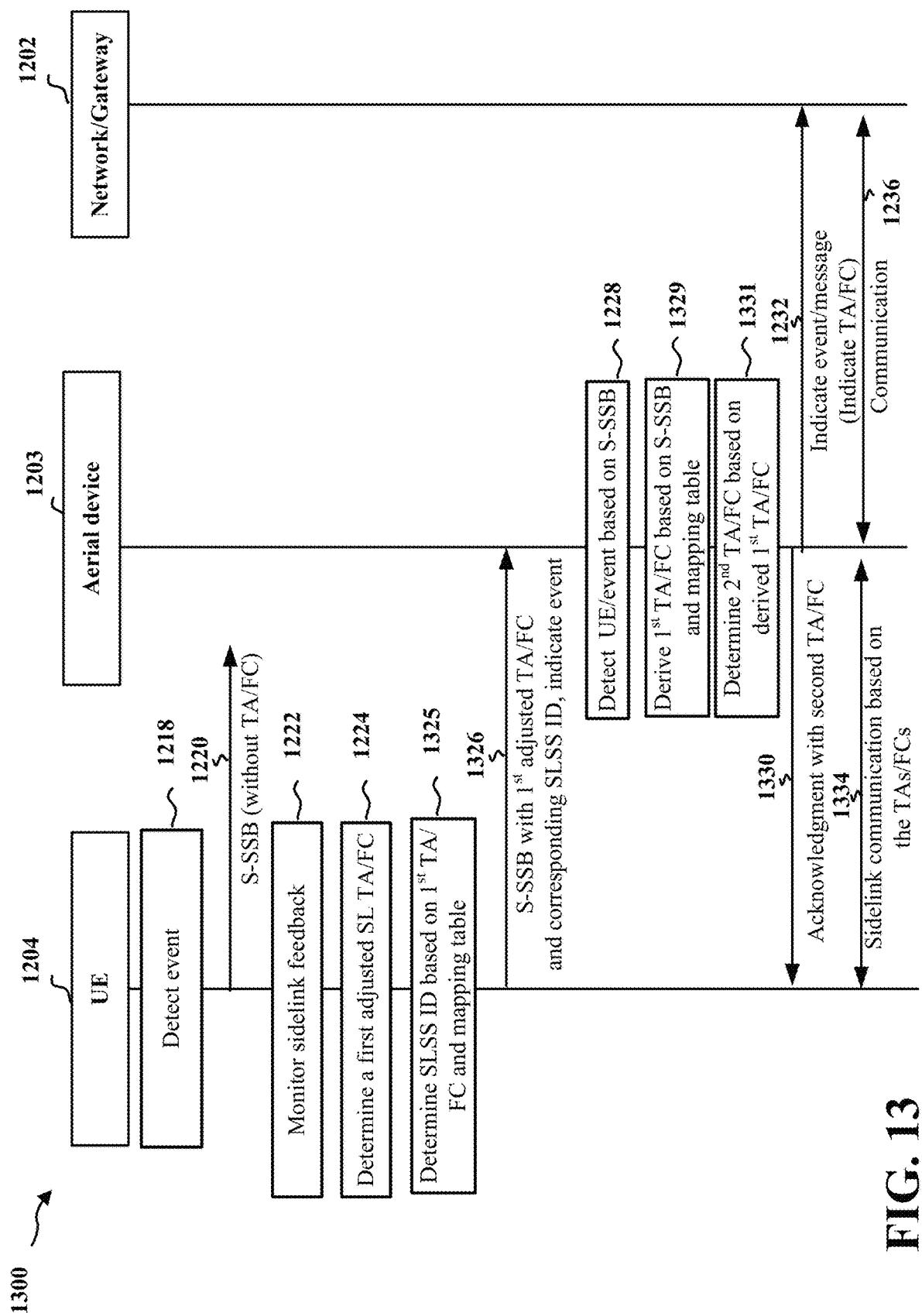
FIG. 13 is a communication flow including communication between a UE and an aerial device to provide information to a network, in accordance with aspects presented herein.

FIG. 13 illustrates an example communication flow 1300 having the application of the TA/FC by the UE similar to FIG. 12. The actions that have already been described in connection with FIG. 12 are shown with a same reference number. In FIG. 13, the UE determines the SLSS-ID, at 1325, based on the first TA/FC and based on the mapping table that maps TA/FC values or ranges to SLSS IDs. The S-SSB 1326 that the UE 1204 transmits is transmitted with the first TA/FC, and the SLSS-ID determined, at 1325. In some aspects, the UE 1204 may optionally further indicate the mapping table to the aerial device 1203 in the S-SSB transmission 1326. Then, at 1329, the aerial device may derive the first TA/FC used for the S-SSB based on the indicated SLSS ID and the mapping table. At 1331, the aerial device 1203 may determine a second TA/FC based on the first TA/FC. The second TA/FC may take into account of the derived first TA/FC. The aerial device may then apply the second TA/FC when transmitting the acknowledgment 1330 and/or when transmitting or receiving sidelink communication 1334 with the UE 1204. The example in FIG. 13 illustrates that the aerial device may adjust its TA/FC to compensate for the delay between the UE 1204 and the aerial device 1203, and the UE 1204 may monitor for the sidelink communication (e.g., 1330/1334) without performing TA/FC.

By using an S-SSB to indicate its presence and/or a communication event, the UE may provide more reliable communication, e.g., considering the potential for a large distance/speed between the UE and an aerial device. The use of the S-SSB also enables a UE out of terrestrial network coverage to indicate its communication event to an aerial device that is potentially distant from the UE, with or without adjusting its TA/FC for sidelink communication. The use of sidelink communication between the UE and the aerial device helps to mitigate or avoid interference with a terrestrial network for situations in which no communication event occurs for a UE.

Figure 14:
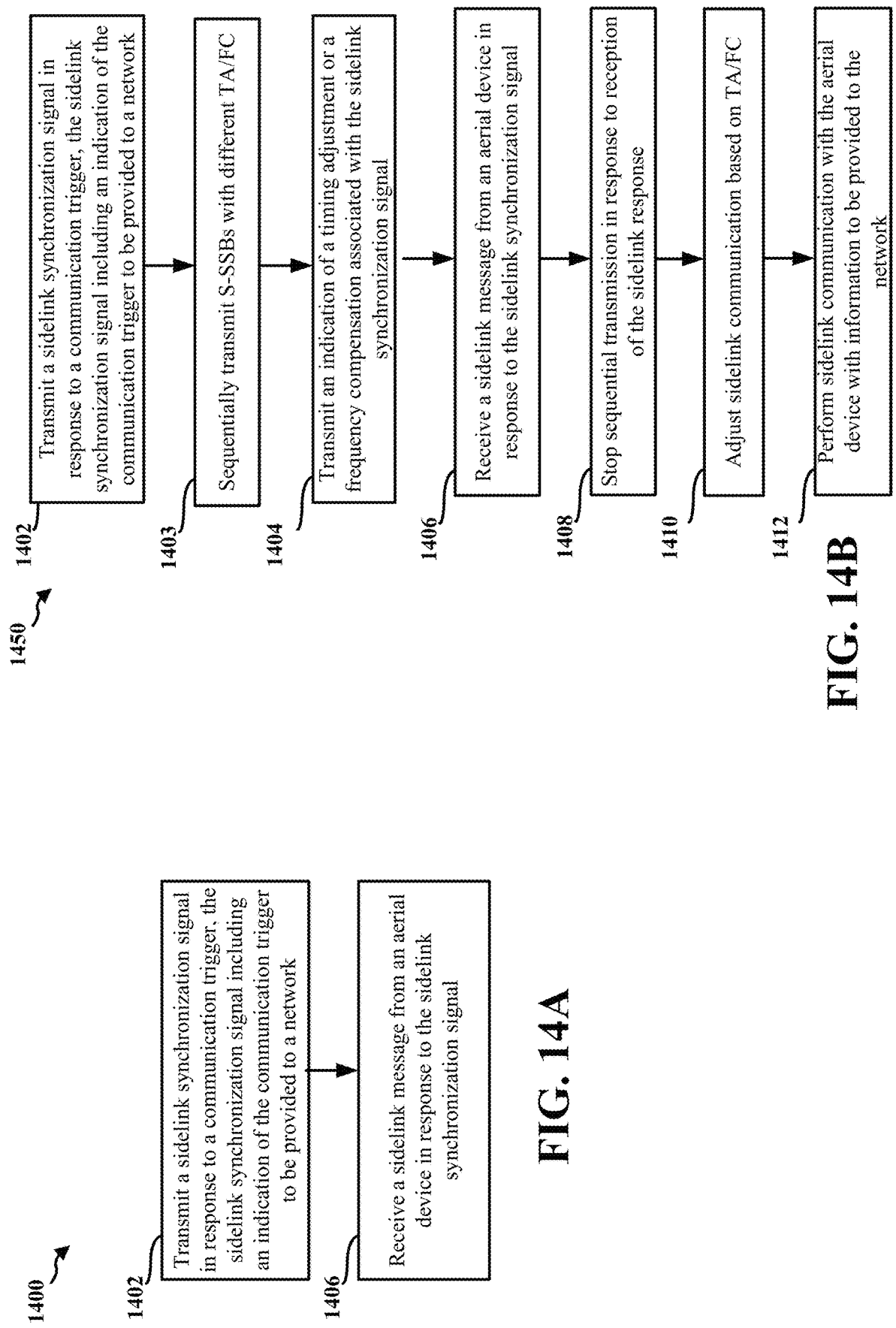
FIGS. 14A and 14B are flowcharts of methods of wireless communication at user equipment, in accordance with aspects presented herein.

FIG. 14A is a flowchart 1400 of a method of wireless communication. The method may be performed by a UE (e.g., the UE 104, 504, 604, 704, 804, 1004, 1104, 1204; the device 450, the apparatus 1502). The method enables the UE to transmit sidelink communication with an aerial device in response to a communication trigger in a manner the increases a likelihood of discovery and communicates event trigger information in an efficient manner. The efficient communication may save battery power and enable the UE to transmit such message for a longer period of time. The aspects presented herein enable an aerial device to discover the UE in a manner that reduced interference from the aerial device to a terrestrial network if there is no communication from the UE.

At 1402, the UE transmits a sidelink synchronization signal in response to a communication trigger, the sidelink synchronization signal including an indication of the communication trigger to be provided to a network. The transmission of the sidelink synchronization signal may be performed, e.g., by the S-SSB component 1540 of the apparatus 1502 in FIG. 15. The network may include at least one of a terrestrial network or a non-terrestrial network. The sidelink synchronization signal may include an S-SSB that includes the indication of the communication trigger. The indication may include one or more bits in a MIB comprised in an S-SSB. The indication may include an S-SSB ID associated with the communication trigger. An association between a set of S-SSB IDs and one or more communication triggers may be configured, the S-SSB ID comprised in the indication being one of the set of S-SSB IDs. The UE may be configured with a set of S-SSB IDs associated with one or more communication triggers, the S-SSB ID comprised in the indication being one of the set of S-SSB IDs. The S-SSB ID of the sidelink synchronization signal transmitted by the UE may be one of a set of multiple S-SSB IDs, each S-SSB ID being associated with one or more communication triggers. FIGS. 10A-13 illustrate various example aspects of a UE transmitting S-SSB(s) to an aerial device.

At 1406, the UE receives a sidelink message from an aerial device in response to the sidelink synchronization signal. The sidelink response may include one or more of an ACK for the sidelink synchronization signal, a PSBCH message, a PSCCH message, a PSSCH message, or a PSFCH message. The reception of the response may be performed, e.g., by a sidelink response component 1542 of the apparatus 1502 in FIG. 15. FIGS. 10A-13 illustrate various example of the UE receiving a response from the aerial device (e.g., 1026, 1230, 1334, 1330, 1334).

FIG. 14B illustrates an example flowchart 1450 that may include 1402 and 16406 from FIG. 14A. As illustrated at 1412, the UE may transmit communication, to be provided to a network, in a sidelink transmission to the aerial device. For example, the sidelink transmission to the aerial device may include information from the UE to be provided to or sent to the network. FIGS. 10A-13 illustrate various example aspects of the UE performing (e.g., transmitting and/or receiving) sidelink communication (e.g., 1026, 1334, 1334) with an aerial device for communication to a network, and illustrate the aerial device relaying communication for the UE with a network. The sidelink communication may be performed, e.g., by the transmission component 1534 and/or the reception component 1530 of the apparatus 1502 in FIG. 15.

In some aspects, transmission of the sidelink synchronization signal, e.g., at 1402, may include transmission the sidelink synchronization signal with a timing adjustment or frequency compensation, the response from the aerial device indicating to the UE to apply the timing adjustment or the frequency compensation for communication with the aerial device. The sidelink message from the aerial device may be in response to the transmission of the sidelink synchronization signal with a timing adjustment or a frequency compensation, and, at 1410, the UE may adjust a timing or a frequency of an additional sidelink transmission to the aerial device based on the timing adjustment or the frequency compensation, the additional sidelink transmission including information to be provided to the network. An S-SSB ID may be associated with the timing adjustment or the frequency compensation. The UE may monitor for the sidelink message from the aerial device, in order to receive the sidelink message at 1406, the monitoring being performed with a time delay based on the timing adjustment or with a frequency adjustment based on the frequency compensation applied to the sidelink synchronization signal.

As illustrated at 1403, the UE may sequentially transmit multiple transmissions of the sidelink synchronization signal with at least one of a different timing adjustment or a different frequency compensation. FIGS. 12 and 13 illustrate examples of the UE transmitting SSBs with different TA/FC. The sequential transmission may assist the UE in attempting to reach aerial devices at different distances or different altitudes. As illustrated at 1408, the UE may stop sequential transmission of the sidelink synchronization signal in response to reception of the sidelink message from the aerial device. The sequential transmission and the stopping of the sequential transmission may be performed, e.g., by the S-SSB component 1540 of the apparatus 1502 in FIG. 15. The sidelink message may include one or more of an ACK for the sidelink synchronization signal, a PSBCH message, a PSCCH message, a PSSCH message, or a PSFCH message.

In some aspects, the UE may transmit an indication of the TA/FC associated with the S-SSB to the aerial device. The indication may enable the aerial device to apply a corresponding TA/FC for sidelink communication with the UE. FIG. 13 illustrates example aspects of indicating the TA/FC to the aerial device. As an example, the UE may transmit a first sidelink synchronization signal with at least one of a first timing adjustment or a first frequency compensation associated with a first S-SSB ID and may transmit a second sidelink synchronization signal with at least one of a second timing adjustment or a second frequency compensation associated with a second S-SSB ID. An S-SSB ID may be associated with a corresponding timing adjustment or a corresponding frequency compensation, e.g., as described in connection with FIGS. 12 and 13. The transmission of the indication may be performed, e.g., by the TA/FC indication component 1544 of the apparatus 1502 in FIG. 15.

The sidelink response, at 1406, may be to a transmission of the sidelink synchronization signal with a corresponding timing adjustment or a corresponding frequency compensation. In some aspects, the UE may adjust, at 1410, adjusting a timing or a frequency of an additional sidelink transmission to the aerial device based on the corresponding timing adjustment or the corresponding frequency compensation associated with the transmission of the sidelink synchronization signal, the additional sidelink transmission including communication for the network, e.g., by the TA/FC adjustment component 1546 of the apparatus 1502 in FIG. 15. FIG. 12 illustrates example aspects of the UE applying an adjustment for sidelink communication with the aerial device. An S-SSB ID may be associated with a corresponding timing adjustment or a corresponding frequency compensation. As an example, as part of the sidelink communication, at 1412, the UE may monitor for the sidelink message from the aerial device to one or more of the multiple transmissions of the sidelink synchronization signal, the monitoring being performed with a time delay based on a corresponding timing adjustment or with a corresponding frequency adjustment based on a corresponding sidelink synchronization signal.

Figure 15:
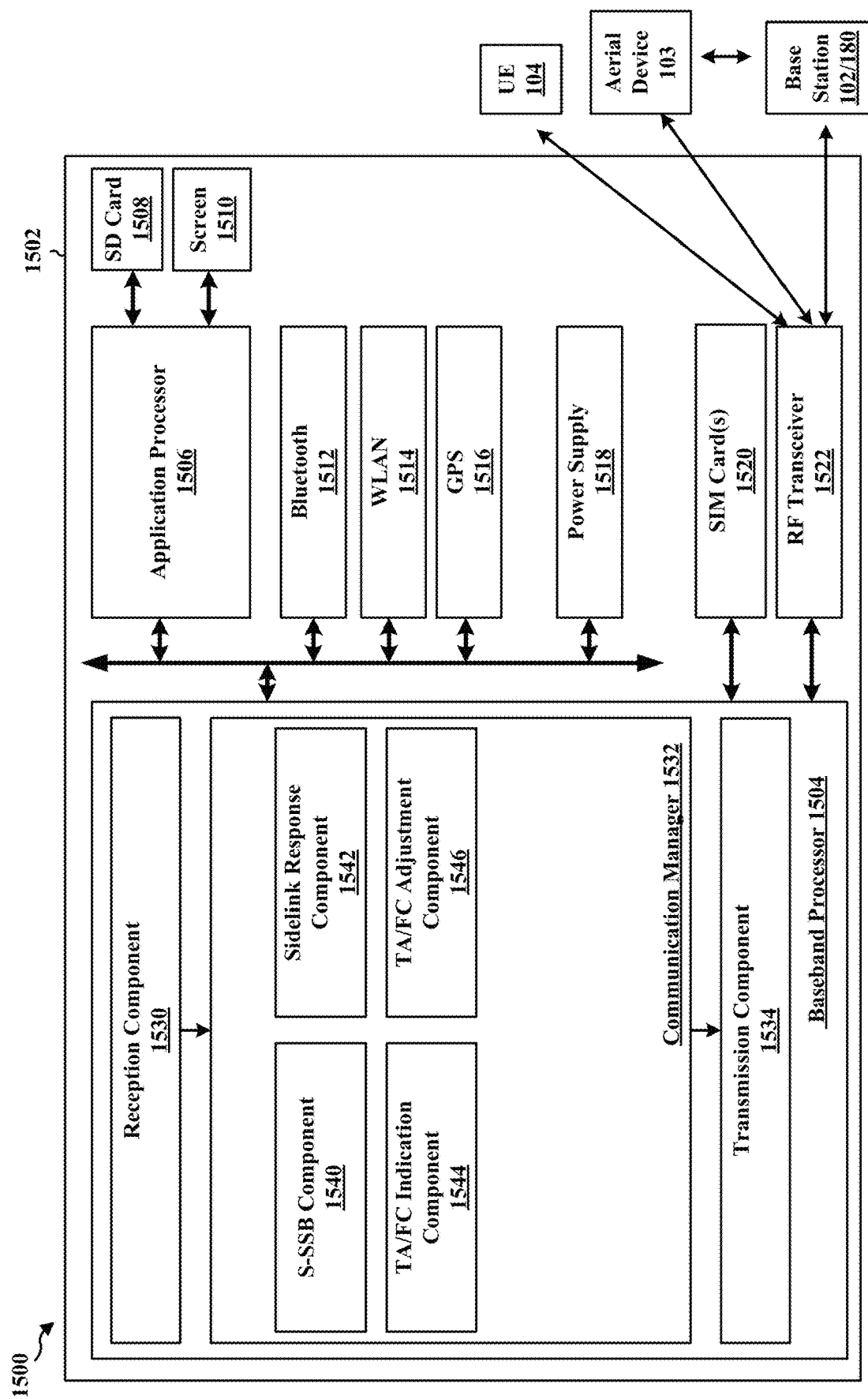
FIG. 15 is a diagram illustrating an example of a hardware implementation for an example apparatus, in accordance with aspects presented herein.

FIG. 15 is a diagram 1500 illustrating an example of a hardware implementation for an apparatus 1502. The apparatus 1502 may be a UE, or another device configured to transmit and/or receive sidelink communication. The apparatus 1502 includes a baseband processor 1504 (also referred to as a modem) coupled to a RF transceiver 1522. In some aspects, the baseband processor 1504 may be a cellular baseband processor and/or the RF transceiver 1522 may be a cellular RF transceiver. The apparatus 1502 may further include one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and/or a power supply 1518. The baseband processor 1504 communicates through the RF transceiver 1522 with the UE 104 and/or BS 102/180. The baseband processor 1504 may include a computer-readable medium/memory. The computer-readable medium/memory may be non-transitory. The baseband processor 1504 is responsible for general processing, including the execution of software stored on the computer-readable medium/memory. The software, when executed by the baseband processor 1504, causes the baseband processor 1504 to perform the various functions described in the present application. The computer-readable medium/memory may also be used for storing data that is manipulated by the baseband processor 1504 when executing software. The baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband processor 1504. The baseband processor 1504 may be a component of the device 450 and may include the memory 460 and/or at least one of the TX processor 468, the RX processor 456, and the controller/processor 459. In one configuration, the apparatus 1502 may be a modem chip and include just the baseband processor 1504, and in another configuration, the apparatus 1502 may be the entire UE (e.g., see 450 of FIG. 3) and include the additional modules of the apparatus 1502.

The communication manager 1532 includes an S-SSB component 1540 that is configured to transmit a sidelink synchronization signal in response to a communication trigger, the sidelink synchronization signal including an indication of the communication trigger to be provided to a network, e.g., as described in connection with 1402 in FIGS. 14A and 14B. The S-SSB component may be further configured to sequentially transmit S-SSBs with different TA/FC, e.g., as described in connection with 1406 in FIG. 14B and/or to stop the sequential transmission in response to receiving the sidelink message, at 1408. The communication manager 1532 further includes a sidelink response component 1542 that is configured to receive a sidelink message from an aerial device in response to the sidelink synchronization signal, e.g., as described in connection with 1406 in FIGS. 14A and 14B. The communication manager 1532 further includes a TA/FC indication component 1544 that is configured to transmit an indication of a timing adjustment or a frequency compensation associated with the sidelink synchronization signal, e.g., as described in connection with 1404 in FIG. 14B. The communication manager 1532 further includes a TA/FC adjustment component 1546 that is configured to adjust sidelink communication based on TA/FC, e.g., as described in connection with 1410 in FIG. 14B. The transmission component 1534 and/or the reception component 1530 may be configured to perform sidelink communication with the aerial device for communication to a network, e.g., as described in connection with 1412 in FIG. 14B.

The apparatus may include additional components that perform each of the blocks of the algorithm in the flowcharts of FIGS. 14A, 14B and/or any of the aspects performed by the UE in FIGS. 8, 10A, and/or 11-13. As such, each block in the flowcharts of FIGS. 14A, 14B and/or any of the aspects performed by the UE in FIGS. 8, 10A, and/or 11-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband processor 1504, includes means for transmitting a sidelink synchronization signal in response to a communication trigger, the sidelink synchronization signal including an indication of the communication trigger to be provided to a network; and means for receiving a sidelink message from an aerial device in response to the sidelink synchronization signal. The apparatus 1502 may further include means for transmitting communication for a network in a sidelink transmission to the aerial device. The apparatus 1502 may further include means for adjusting a timing or a frequency of an additional sidelink transmission to the aerial device based on the timing adjustment or the frequency compensation, the additional sidelink transmission including information to be provided to the network. The apparatus 1502 may further include means for monitoring for the sidelink message from the aerial device, the monitoring being performed with a time delay based on the timing adjustment or with a frequency adjustment based on the frequency compensation applied to the sidelink synchronization signal. The apparatus 1502 may further include means for sequentially transmitting multiple transmissions of the sidelink synchronization signal with at least one of a different timing adjustment or a different frequency compensation. The apparatus 1502 may further include means for stopping sequential transmission of the sidelink synchronization signal in response to reception of the sidelink message from the aerial device. The apparatus 1502 may further include means for adjusting a timing or a frequency of an additional sidelink transmission to the aerial device based on the corresponding timing adjustment or the corresponding frequency compensation associated with the transmission of the sidelink synchronization signal, the additional sidelink transmission including communication for the network. The apparatus 1502 may further include means for transmitting a first sidelink synchronization signal with at least one of a first timing adjustment or a first frequency compensation associated with a first S-SSB ID. The apparatus 1502 may further include means for transmitting a second sidelink synchronization signal with at least one of a second timing adjustment or a second frequency compensation associated with a second S-SSB ID. The apparatus 1502 may further include means for monitoring for the sidelink message from the aerial device to one or more of the multiple transmissions of the sidelink synchronization signal, the monitoring being performed with a time delay based on a corresponding timing adjustment or with a corresponding frequency adjustment based on a corresponding sidelink synchronization signal. The means may be one or more of the components of the apparatus 1502 configured to perform the functions recited by the means. As described herein, the apparatus 1502 may include the TX Processor 468, the RX Processor 456, and the controller/processor 459. As such, in one configuration, the means may be the TX Processor 468, the RX Processor 456, and the controller/processor 459 configured to perform the functions recited by the means.

Figures 16A, 16B:
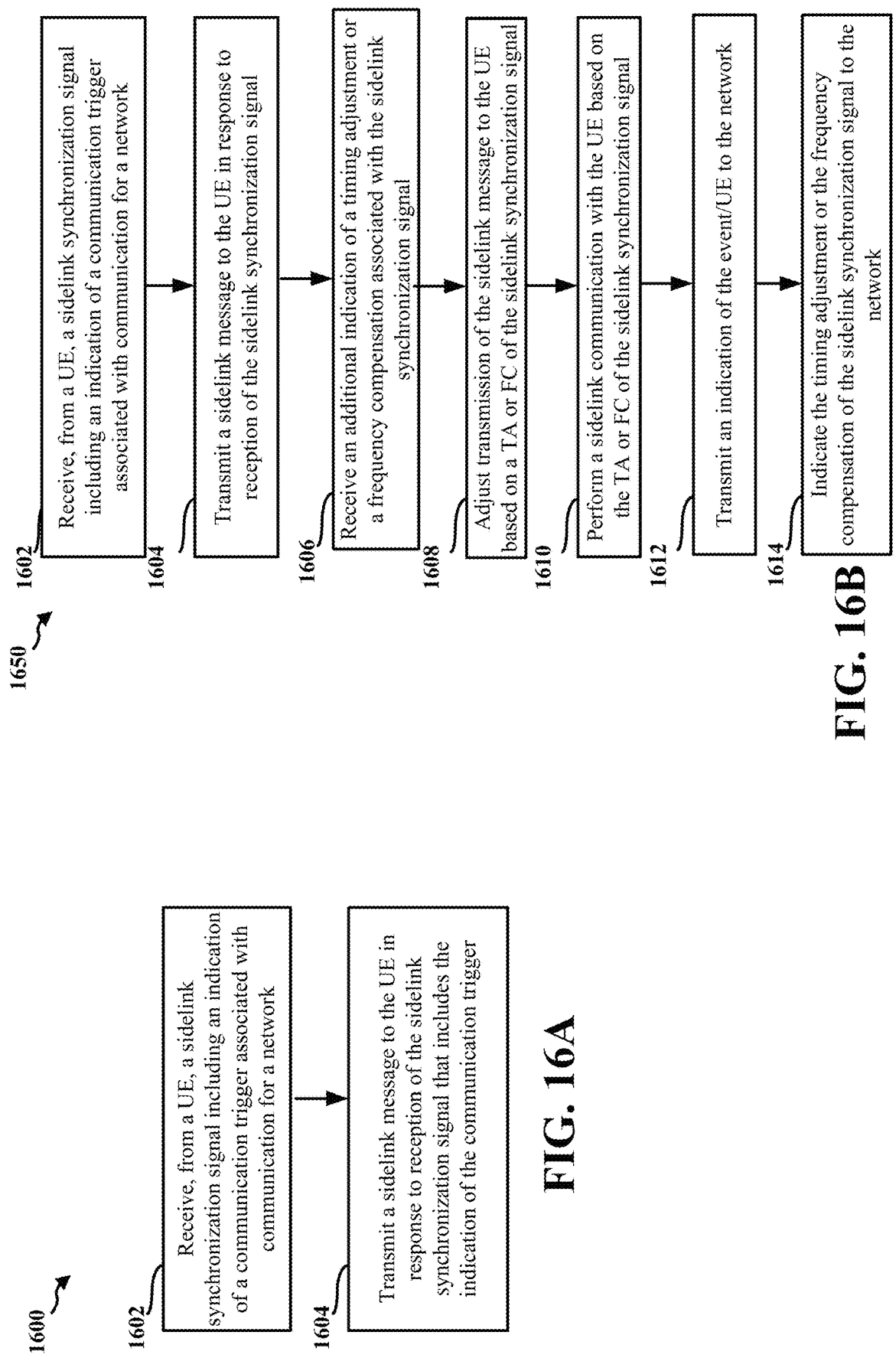
FIGS. 16A and 16B are flowcharts of methods of wireless communication at an aerial device, in accordance with aspects presented herein.

FIG. 16A is a flowchart 1600 of a method of wireless communication. The method may be performed by an aerial device (e.g., the aerial device 103, 503, 603, 703, 803, 1003, 1103, 1203; the device 410; the apparatus 1702). The aspects presented herein enable an aerial device to discover a UE based on a S-SSB in a manner that reduces interference from the aerial device to a terrestrial network when there is no communication from the UE. As well, the use of the S-SSB enables the aerial device to efficient determine a communication trigger for the UE and to report the communication trigger to a network. The use of the S-SSB enables the UE and the aerial device to exchange sidelink communication in a more reliable manner through improved synchronization.

At 1602, the aerial device receives, from a UE, a sidelink synchronization signal including an indication of a communication trigger associated with communication for a network. The reception of the sidelink synchronization signal may be performed, e.g., by the S-SSB reception component 1740 of the apparatus 1702 in FIG. 17. The network may include at least one of a terrestrial network or a non-terrestrial network. The indication may include one or more bits in a sidelink MIB comprised in an S-SSB. The indication may include an S-SSB ID associated with the communication trigger. The S-SSB ID corresponding to the indication may be one of a set of multiple S-SSB IDs, each SSB-ID being associated with one or more types of communication triggers. An association between a set of S-SSB IDs and one or more communication triggers may be configured, the S-SSB ID comprised in the indication being one of the set of S-SSB IDs. FIGS. 10A-13 illustrate various example aspects of an aerial device receiving an S-SSB from a UE.

At 1604, the aerial device transmits a sidelink message to the UE in response to reception of the sidelink synchronization signal that includes the indication of the communication trigger. The sidelink message may include one or more of an ACK for the sidelink synchronization signal, a PSBCH message, a PSCCH message, a PSSCH message, or a PSFCH message. The transmission of the response may be performed, e.g., by a sidelink response component 1742 of the apparatus 1702 in FIG. 17. FIGS. 10A-13 illustrate various example the aerial device providing a response (e.g., 1026, 1230, 1334, 1330, 1334) to a UE.

FIG. 16B illustrates an example flowchart 1650 that may include 1602 and 1604 from FIG. 16A. As illustrated at 1612, the aerial device may transmit an indication of the communication event and/or of the UE to a network. The transmission may be performed, e.g., by the network communication component 1748 of the apparatus 1702 in FIG. 17. FIGS. 10A-13 illustrate example aspects of the aerial device providing an indication to the network. As illustrated at 1610, the aerial device may perform a sidelink communication with the UE for the communication for the network. The sidelink communication may be performed, e.g., by the reception component 1730 and/or the transmission component 1734 of the apparatus 1702 in FIG. 17. FIGS. 10A-13 illustrate various example the aerial device performing (e.g., transmitting and/or receiving) sidelink communication (e.g., 1026, 1334, 1334) with a UE, and illustrate the aerial device relaying communication for the UE with a network. For example, the aerial device may transmit the communication from the aerial device in an uplink transmission to the network in response to the indication.

As illustrated at 1606, the aerial device may receive an additional indication of a timing adjustment or a frequency compensation associated with the sidelink synchronization signal. The reception may be performed, e.g., by the TA/FC indication component 1744 of the apparatus 1702 in FIG. 17. The timing adjustment or the frequency compensation for the sidelink synchronization signal may be based on a S-SSB ID in the sidelink synchronization signal. The S-SSB ID corresponding to the indication may be one of a set of multiple S-SSB IDs, each SSB-ID being associated with one or more types of communication triggers. In some aspects, the aerial device may be configured with a set of S-SSB IDs associated with one or more communication triggers, the S-SSB ID comprised in the indication being one of the set of S-SSB IDs. FIGS. 12 and 13 illustrate example aspects of the aerial device receiving an indication of a TA/FC for a particular S-SSB from the UE. The identification of the TA/FC may improve sidelink communication between the aerial device and the UE, and may enable the aerial device to adjust for a propagation delay.

In some aspects, the aerial device may be configured with a set of S-SSB IDs associated with one or more timing adjustments or one or more frequency compensation for the sidelink synchronization signal, and receiving the additional indication of a timing adjustment or a frequency compensation associated with the sidelink synchronization signal is based on the configuration.

As illustrated at 1614, the aerial device may indicate the timing adjustment or the frequency compensation of the sidelink synchronization signal to the network. FIGS. 12 and 13 illustrate examples in which the aerial device may indicate the TA/FC to the network, e.g., at 1232. In some aspects, the aerial device may also indicate a location of the aerial device. The indication of the location of the aerial device and the TA/FC may assist in identifying a location of the UE.

As illustrated at 1608, the aerial device may adjust sidelink communication with the UE based on the TA/FC. As an example, the aerial device may adjust transmission (e.g., based on a timing advance or frequency compensation) of the sidelink message to the UE based on a timing adjustment or a frequency compensation of the sidelink synchronization signal. As another example, the aerial device may perform a sidelink communication with the UE, at 1610 based on the timing adjustment or the frequency compensation of the sidelink synchronization signal, e.g., as adjusted at 1608. The sidelink communication may include the transmission and/or reception of sidelink communication with the UE based on the TA/FC. FIG. 13 illustrates example aspects in which an aerial device may adjust the TA/FC. The adjustment may be performed, e.g., by the TA/FC adjustment component 1746 of the apparatus 1702 in FIG. 17.

Figure 17:
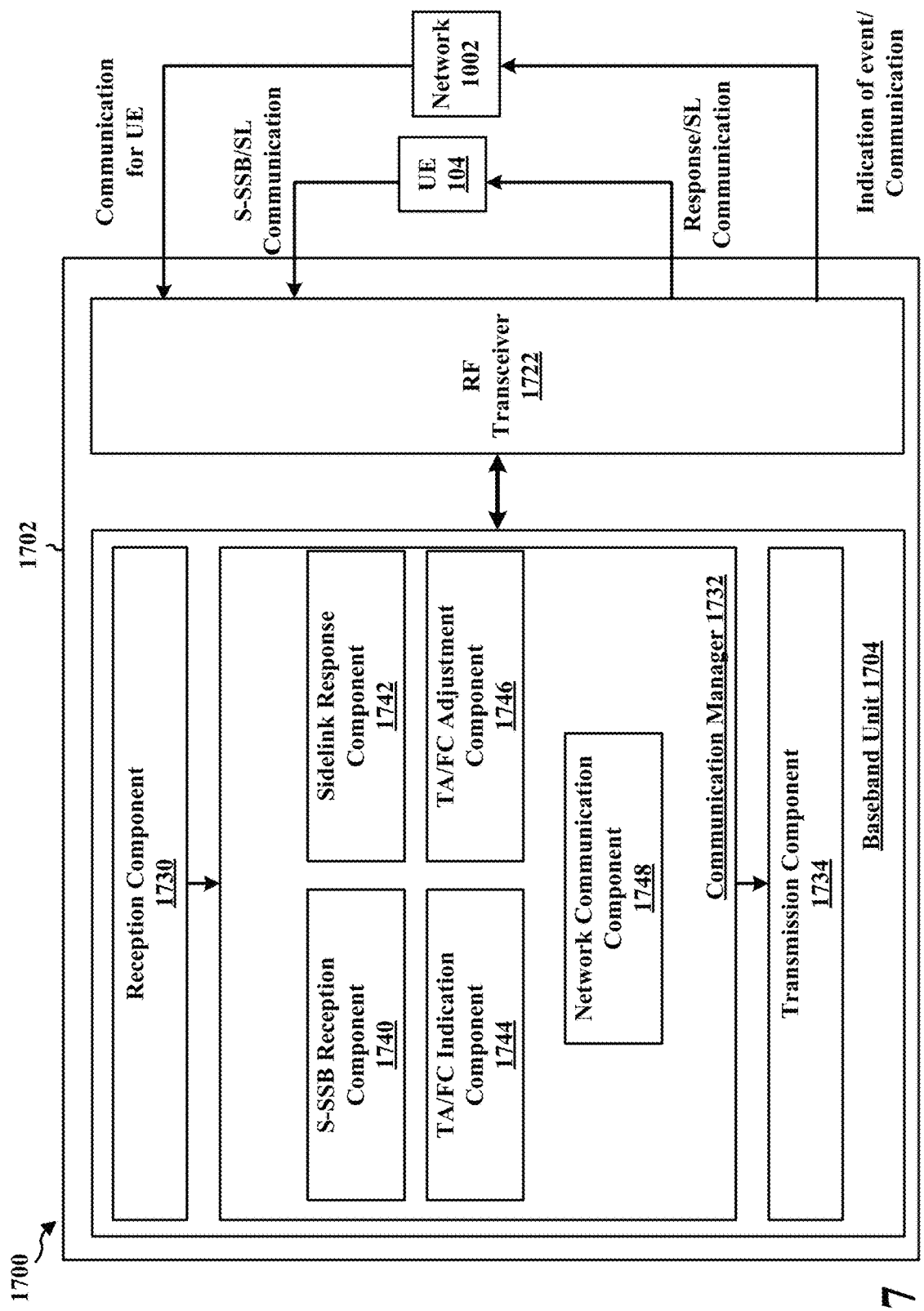
FIG. 17 is a diagram illustrating an example of a hardware implementation for an example apparatus, in accordance with aspects presented herein.

FIG. 17 is a diagram 1700 illustrating an example of a hardware implementation for an apparatus 1702. The apparatus 1702 may be an aerial device (e.g., aerial device 103), a component of an aerial device, or may implement aerial device functionality. In some aspects, the apparatus 1702 may include a baseband unit 1704. The baseband unit 1704 may communicate through an RF transceiver 1722 with the UE 104 and/or a gateway/network 1002. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the device 410 and may include the memory 476 and/or at least one of the TX processor 416, the RX processor 470, and the controller/processor 475.

The communication manager 1732 includes an S-SSB reception component 1740 that is configured to receive, from a UE, a sidelink synchronization signal including an indication of a communication trigger associated with communication for a network, e.g., as described in connection with 1602 in FIGS. 16A and 16B. The communication manager 1732 further includes a sidelink response component 1742 that is configured to transmit a sidelink message to the UE in response to reception of the sidelink synchronization signal, e.g., as described in connection with 1604 in FIGS. 16A and 16B. The communication manager 1732 further includes a TA/FC indication component 1744 that is configured to receive an indication of a TA/FC from the UE and/or provide an indication of a TA/FC to a network, e.g., as described in connection with 1606 and/or 1614 in FIG. 16B. The communication manager 1732 further includes a TA/FC adjustment component 1746 that is configured to adjust sidelink communication based on the TA/FC, e.g., as described in connection with 1608 in FIG. 16B. The communication manager 1732 further includes a network communication component 1748 that transmits an indication of the communication event and/or the UE to the network 1002, e.g., as described in connection with 1612 in FIG. 16B. The reception component 1730 and/or the transmission component 1734 may be configured to perform sidelink communication with the UE 104 and/or communication with the network 1002 about the UE or for the UE, e.g., as described in connection with 1610 in FIG. 16B.

The apparatus may include additional components that perform each of the blocks of the algorithm in the flowcharts of FIGS. 16A, 16B, and/or the aspects performed by the aerial device in any of FIGS. 8, 10A, and/or 11-13. As such, each block in the flowcharts of FIGS. 16A, 16B, and/or the aspects performed by the aerial device in any of FIGS. 8, 10A, and/or 11-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1702 may include a variety of components configured for various functions. In one configuration, the apparatus 1702, and in particular the baseband unit 1704, includes means for receiving, from a UE, a sidelink synchronization signal including an indication of a communication trigger associated with communication for a network from a UE; and means for transmitting a sidelink message to the UE in response to reception of the sidelink synchronization signal including the indication of the communication trigger for the network. The apparatus 1702 may further include means for performing a sidelink communication with the UE based on the timing adjustment or the frequency compensation of the sidelink synchronization signal. The apparatus 1702 may further include means for transmitting the communication from the aerial device in an uplink transmission to the network in response to the indication. The apparatus 1702 may further include means for receiving an additional indication of a timing adjustment or a frequency compensation associated with the sidelink synchronization signal. The apparatus 1702 may further include means for indicating the timing adjustment or the frequency compensation of the sidelink synchronization signal to the network. The apparatus 1702 may further include means for adjusting transmission of the sidelink response to the UE based on a timing adjustment or a frequency compensation of the sidelink synchronization signal. The apparatus 1702 may further include means for performing a sidelink communication with the UE based on the timing adjustment or the frequency compensation of the sidelink synchronization signal. The means may be one or more of the components of the apparatus 1702 configured to perform the functions recited by the means. As described supra, the apparatus 1702 may include the TX Processor 416, the RX Processor 470, and the controller/processor 475. As such, in one configuration, the means may be the TX Processor 416, the RX Processor 470, and the controller/processor 475 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following example aspects are illustrative only and may be combined with aspects of other examples or teachings described herein, without limitation.

Aspect 1 is a method of wireless communication at a UE, comprising: transmitting a sidelink synchronization signal in response to a communication trigger, the sidelink synchronization signal including an indication of the communication trigger to be provided to a network; and receiving a sidelink message from an aerial device in response to the sidelink synchronization signal.

In aspect 2, the method of aspect 1 further includes transmitting communication for the network in a sidelink transmission to the aerial device.

In aspect 3, the method of aspect 1 or aspect 2 further includes that the network includes at least one of a terrestrial network or a non-terrestrial network.

In aspect 4, the method of any of aspects 1-3 further includes that the sidelink synchronization signal comprises an S-SSB that includes the indication of the communication trigger.

In aspect 5, the method of aspect 4 further includes that the indication comprises one or more bits associated with the communication trigger in a MIB comprised in the S-SSB.

In aspect 6, the method of aspect 4 further includes that the indication comprises an S-SSB ID associated with the communication trigger.

In aspect 7, the method of aspect 6 further includes that the S-SSB ID comprised in the indication being one of a set of multiple S-SSB IDs, each S-SSB ID being associated with one or more communication triggers.

In aspect 8, the method of any of aspects 1-7 further includes that transmitting the sidelink synchronization signal includes transmitting the sidelink synchronization signal with a timing adjustment or a frequency compensation, the sidelink message from the aerial device indicating to the UE to apply the timing adjustment or the frequency compensation for communication with the aerial device.

In aspect 9, the method of aspect 8 further includes that the sidelink message is in response to a transmission of the sidelink synchronization signal with the timing adjustment or the frequency compensation, the method further comprising: adjusting a timing or a frequency of an additional sidelink transmission to the aerial device based on the timing adjustment or the frequency compensation, the additional sidelink transmission including information to be provided to the network.

In aspect 10, the method of aspect 9 further includes that an S-SSB ID is associated with at least one of the timing adjustment or the frequency compensation.

In aspect 11, the method of any of aspects 8-10 further includes that monitoring for the sidelink message from the aerial device, the monitoring being performed with a time delay based on the timing adjustment or with a frequency adjustment based on the frequency compensation applied to the sidelink synchronization signal.

In aspect 12, the method of any of aspects 1-11 further includes transmitting the sidelink synchronization signal includes: sequentially transmitting multiple transmissions of the sidelink synchronization signal with at least one of a different timing adjustment or a different frequency compensation.

In aspect 13, the method of aspect 12 further includes stopping transmission of the sidelink synchronization signal in response to reception of the sidelink message from the aerial device, the sidelink message comprising one or more of: an ACK for the sidelink synchronization signal, a PSBCH message, a PSCCH message, a PSSCH message, or a PSFCH message.

In aspect 14, the method of aspect 12 or aspect 13 further includes that the sidelink message is in response to a transmission of the sidelink synchronization signal with a corresponding timing adjustment or a corresponding frequency compensation, the method further comprising: adjusting a timing or a frequency of an additional sidelink transmission to the aerial device based on the corresponding timing adjustment or the corresponding frequency compensation associated with the transmission of the sidelink synchronization signal, the additional sidelink transmission including communication for the network.

In aspect 15, the method of any of aspects 12-14 further includes that sequentially transmitting the multiple transmissions of the sidelink synchronization signal includes: transmitting a first sidelink synchronization signal with at least one of a first timing adjustment or a first frequency compensation associated with a first S-SSB ID; and transmitting a second sidelink synchronization signal with at least one of a second timing adjustment or a second frequency compensation associated with a second S-SSB ID.

In aspect 16, the method of any of aspects 12-15 further includes that an S-SSB ID is associated with a corresponding timing adjustment or a corresponding frequency compensation.

In aspect 17, the method of any of aspects 12-16 further includes that monitoring for the sidelink message from the aerial device to one or more of the multiple transmissions of the sidelink synchronization signal, the monitoring being performed with a time delay based on a corresponding timing adjustment or with a corresponding frequency adjustment based on a corresponding sidelink synchronization signal.

Aspect 18 is an apparatus for wireless communication comprising means to perform the method of any of aspects 1-17.

In aspect 19, the apparatus of aspect 18 further includes at least one antenna coupled to the means to perform the method of any of aspects 1-17.

In aspect 20, the apparatus of aspect 18 or 19 further includes a transceiver coupled to the means to perform the method of any of aspects 1-17.

Aspect 21 is an apparatus for wireless communication comprising memory and at least one processor coupled to the memory, the memory and the at least one processor configured to perform the method of any of aspects 1-17.

In aspect 22, the apparatus of aspect 21 further includes at least one antenna coupled to the at least one processor.

In aspect 23, the apparatus of aspect 21 or 22 further includes a transceiver coupled to the at least one processor.

Aspect 24 is a non-transitory computer-readable storage medium storing computer executable code, the code when executed by a processor causes the processor to perform the method of any of aspects 1-17.

Aspect 25 is a method of wireless communication at an aerial device, comprising: receiving, from a UE, a sidelink synchronization signal including an indication of a communication trigger associated with communication for a network; and transmitting a sidelink message to the UE in response to reception of the sidelink synchronization signal that includes the indication of the communication trigger.

In aspect 26, the method of aspect 25 further includes transmitting the communication from the aerial device in an uplink transmission to the network in response to the indication.

In aspect 27, the method of aspect 25 or 26 further includes that the network includes at least one of a terrestrial network or a non-terrestrial network.

In aspect 28, the method of any of aspects 25-27 further includes that the indication comprises one or more bits in a MIB comprised in an S-SSB.

In aspect 29, the method of any of aspects 25-27 further includes that the indication comprises an S-SSB ID associated with the communication trigger.

In aspect 30, the method of aspect 29 further includes that the S-SSB ID comprised in the indication is one of a set of multiple S-SSB IDs, each SSB-ID being associated with one or more types of communication triggers.

In aspect 31, the method of any of aspects 25-30 further includes that the sidelink message comprises one or more of: an ACK for the sidelink synchronization signal, a PSBCH message, a PSCCH message, a PSSCH message, or a PSFCH message.

In aspect 32, the method of any of aspects 25-31 further includes receiving an additional indication of a timing adjustment or a frequency compensation associated with the sidelink synchronization signal.

In aspect 33, the method of aspect 32 further includes that at least one of the timing adjustment or the frequency compensation for the sidelink synchronization signal is based on an S-SSB ID in the sidelink synchronization signal.

In aspect 34, the method of aspect 33 further includes that the aerial device is configured with a set of S-SSB IDs associated with one or more timing adjustments or one or more frequency compensation for the sidelink synchronization signal, and receiving the additional indication of the timing adjustment or the frequency compensation associated with the sidelink synchronization signal is based on a configuration.

In aspect 35, the method of any of aspects 32-34 further includes indicating the timing adjustment or the frequency compensation of the sidelink synchronization signal to the network.

In aspect 36, the method of any of aspects 25-35 further includes adjusting transmission of the sidelink message to the UE based on a timing adjustment or a frequency compensation of the sidelink synchronization signal.

In aspect 37, the method of any of aspects 25-36 further includes performing a sidelink communication with the UE based on the timing adjustment or the frequency compensation of the sidelink synchronization signal.

Aspect 38 is an apparatus for wireless communication comprising means to perform the method of any of aspects 25-37.

In aspect 39, the apparatus of aspect 38 further includes at least one antenna coupled to the means to perform the method of any of aspects 25-37.

In aspect 40, the apparatus of aspect 38 or 39 further includes a transceiver coupled to the means to perform the method of any of aspects 25-37.

Aspect 41 is an apparatus for wireless communication comprising memory and at least one processor coupled to the memory, the memory and the at least one processor configured to perform the method of any of aspects 25-37.

In aspect 42, the apparatus of aspect 41 further includes at least one antenna coupled to the at least one processor.

In aspect 43, the apparatus of aspect 41 or 42 further includes a transceiver coupled to the at least one processor.

Aspect 44 is a non-transitory computer-readable storage medium storing computer executable code, the code when executed by a processor causes the processor to perform the method of any of aspects 25-37.

What is claimed is:

1. An apparatus for wireless communication at a user equipment (UE), comprising:
memory; and
one or more processors coupled to the memory and configured to cause the UE to:
transmit, while outside of coverage of a terrestrial network that includes a base station, a sidelink synchronization signal block (S-SSB) in response to a communication trigger, wherein the S-SSB includes an indication of the communication trigger that is for relay to the terrestrial network, wherein the S-SSB is transmitted to the base station via an aerial device as a relay of communication between the UE and the base station of the terrestrial network;
receive a sidelink message from the aerial device in response to the S-SSB; and
communicate via sidelink communications with the aerial device in response to reception of the sidelink message, wherein the sidelink communications include the communication between the UE and the base station of the terrestrial network.

2. The apparatus of claim 1, further comprising:
at least one antenna coupled to the one or more processors, wherein the one or more processors are further configured to cause the UE to:
transmit the communication for the base station of the terrestrial network in a sidelink transmission to the aerial device.

3. The apparatus of claim 1, wherein the S-SSB includes the indication of the communication trigger.

4. The apparatus of claim 3, wherein the indication of the communication trigger comprises one or more bits associated with the communication trigger in a master information block (MIB) comprised in the S-SSB.

5. The apparatus of claim 3, wherein the indication of the communication trigger comprises an S-SSB identifier (ID) associated with the communication trigger.

6. The apparatus of claim 5, wherein the S-SSB ID comprised in the indication of the communication trigger is one of a set of multiple S-SSB IDs, wherein each S-SSB ID is associated with one or more communication triggers.

7. The apparatus of claim 1, wherein to transmit the S-SSB, the one or more processors are further configured to cause the UE to transmit the S-SSB with a timing adjustment or a frequency compensation, and wherein the reception of the sidelink message from the aerial device in response to the S-SSB indicates to the UE the timing adjustment or the frequency compensation that compensates for a distance between the UE and the aerial device or a speed of the aerial device.

8. The apparatus of claim 7, wherein the sidelink message is in response to a transmission of the S-SSB with the timing adjustment or the frequency compensation, wherein the one or more processors are further configured to cause the UE to:
adjust a timing or a frequency of an additional sidelink transmission to the aerial device based on the timing adjustment or the frequency compensation, wherein the additional sidelink transmission includes information for the terrestrial network.

9. The apparatus of claim 7, wherein a sidelink synchronization signal block identifier (S-SSB ID) is associated with at least one of the timing adjustment or the frequency compensation.

10. The apparatus of claim 7, wherein the one or more processors are further configured to cause the UE to:
monitor, for the sidelink message from the aerial device, with a time delay based on the timing adjustment or with a frequency adjustment based on the frequency compensation applied to the S-SSB.

11. The apparatus of claim 1, wherein to transmit the S-SSB, the one or more processors are further configured to cause the UE to:
sequentially transmit multiple transmissions of the S-SSB with at least one of a different timing adjustment or a different frequency compensation.

12. The apparatus of claim 11, wherein the one or more processors are further configured to cause the UE to:
stop transmission of the S-SSB in response to the reception of the sidelink message from the aerial device, the sidelink message comprising one or more of:
an acknowledgment (ACK) for the S-SSB,
a physical sidelink broadcast channel (PSBCH) message,
a physical sidelink control channel (PSCCH) message,
a physical sidelink shared channel (PSSCH) message, or
a physical sidelink feedback channel (PSFCH) message.

13. The apparatus of claim 11, wherein the sidelink message is in response to a transmission of the S-SSB with a corresponding timing adjustment or a corresponding frequency compensation, and wherein the one or more processors are further configured to cause the UE to:
adjust a timing or a frequency of an additional sidelink transmission to the aerial device based on the corresponding timing adjustment or the corresponding frequency compensation associated with the transmission of the S-SSB, wherein the additional sidelink transmission includes additional communication for the base station of the terrestrial network.

14. The apparatus of claim 11, wherein to sequentially transmit the multiple transmissions of the S-SSB, the one or more processors are further configured to cause the UE to:
transmit a first sidelink synchronization signal with at least one of a first timing adjustment or a first frequency compensation associated with a first sidelink synchronization signal block identifier (S-SSB ID); and
transmit a second sidelink synchronization signal with at least one of a second timing adjustment or a second frequency compensation associated with a second S-SSB ID.

15. The apparatus of claim 11, wherein an S-SSB ID is associated with a corresponding timing adjustment or a corresponding frequency compensation.

16. The apparatus of claim 11, wherein the one or more processors are further configured to cause the UE to:
monitor, for the sidelink message from the aerial device to one or more of the multiple transmissions of the S-SSB, with a time delay based on a corresponding timing adjustment or with a corresponding frequency adjustment based on a corresponding sidelink synchronization signal.

17. The apparatus of claim 1, wherein the S-SSB includes at least a primary synchronization signal (PSS) and a secondary synchronization signal (SSS).

18. A method of wireless communication at a user equipment (UE), comprising:
transmitting, while outside of coverage of a terrestrial network that includes a base station, a sidelink synchronization signal block (S-SSB) in response to a communication trigger, the S-SSB including an indication of the communication trigger that is for relay to the terrestrial network, wherein the S-SSB is transmitted to the base station via an aerial device as a relay of communication between the UE and the base station of the terrestrial network;
receiving a sidelink message from the aerial device in response to the S-SSB; and
communicating via sidelink communications with the aerial device in response to receiving the sidelink message, wherein the sidelink communications include the communication between the UE and the base station of the terrestrial network.

19. An apparatus for wireless communication at an aerial device, comprising:
memory; and
one or more processors coupled to the memory and configured to cause the aerial device to:
receive a sidelink synchronization signal block (S-SSB) that includes an indication of a communication trigger associated with communication for relay between a user equipment (UE) and a terrestrial network that includes a base station, wherein the UE is outside of coverage of the terrestrial network;
transmit the communication from the aerial device in an uplink transmission to the terrestrial network in response to the indication of the communication trigger;
transmit a sidelink message for the UE in response to reception of the S-SSB that includes the indication of the communication trigger; and
relay, via sidelink communication with the UE after transmission of the sidelink message, the communication between the UE and the terrestrial network.

20. The apparatus of claim 19, wherein the indication of the communication trigger comprises one or more bits in a master information block (MIB) comprised in the S-SSB.

21. The apparatus of claim 19, wherein the indication of the communication trigger comprises an S-SSB identifier (ID) associated with the communication trigger.

22. The apparatus of claim 21, wherein the S-SSB ID comprised in the indication of the communication trigger is one of a set of multiple S-SSB IDs, and wherein each SSB-ID is associated with one or more types of communication triggers.

23. The apparatus of claim 19, wherein the sidelink message comprises one or more of:
an acknowledgment (ACK) for the S-SSB,
a physical sidelink broadcast channel (PSBCH) message,
a physical sidelink control channel (PSCCH) message,
a physical sidelink shared channel (PSSCH) message, or
a physical sidelink feedback channel (PSFCH) message.

24. The apparatus of claim 19, wherein the one or more processors are further configured to cause the aerial device to:
receive an additional indication of a timing adjustment or a frequency compensation associated with the S-SSB.

25. The apparatus of claim 24, wherein at least one of the timing adjustment or the frequency compensation for the S-SSB is based on a sidelink synchronization signal block identifier (S-SSB ID) in the S-SSB.

26. The apparatus of claim 25, wherein the aerial device is configured with a set of S-SSB IDs associated with one or more timing adjustments or one or more frequency compensation for the S-SSB, and the additional indication of the timing adjustment or the frequency compensation associated with the S-SSB is based on a configuration.

27. The apparatus of claim 24, wherein the one or more processors are further configured to cause the aerial device to:
indicate the timing adjustment or the frequency compensation of the S-SSB to the terrestrial network.

28. The apparatus of claim 19, wherein the one or more processors are further configured to cause the aerial device to:
adjust the transmission of the sidelink message to the UE based on a timing adjustment or a frequency compensation of the S-SSB.

29. The apparatus of claim 28, wherein the one or more processors are further configured to cause the aerial device to:
perform one or more sidelink communications with the UE based on the timing adjustment or the frequency compensation of the S-SSB.

30. A method of wireless communication at an aerial device, comprising:
receiving, from a user equipment (UE), a sidelink synchronization signal block (S-SSB) including an indication of a communication trigger associated with communication for relay between the UE and a terrestrial network that includes a base station, wherein the UE is outside of coverage of the terrestrial network;
transmitting the communication from the aerial device in an uplink transmission to the terrestrial network in response to the indication of the communication trigger;
transmitting a sidelink message to the UE in response to reception of the S-SSB that includes the indication of the communication trigger; and
relaying, via sidelink communication with the UE after transmission of the sidelink message, the communication between the UE and the terrestrial network.

* * * * *